(12) United States Patent
Shi et al.

(10) Patent No.: US 12,507,158 B2
(45) Date of Patent: Dec. 23, 2025

(54) METHOD FOR INDICATING ANTENNA SWITCHING CAPABILITY, TERMINAL DEVICE AND COMMUNICATION DEVICE

(71) Applicant: GUANGDONG OPPO MOBILE TELECOMMUNICATIONS CORP., LTD., Guangdong (CN)

(72) Inventors: Zhihua Shi, Guangdong (CN); Wenhong Chen, Guangdong (CN); Yun Fang, Guangdong (CN); Yingpei Huang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 624 days.

(21) Appl. No.: 17/878,345

(22) Filed: Aug. 1, 2022

(65) Prior Publication Data

US 2022/0369214 A1 Nov. 17, 2022

Related U.S. Application Data

(63) Continuation of application No. PCT/CN2020/075904, filed on Feb. 19, 2020.

(51) Int. Cl.
*H04W 48/16* (2009.01)
*H04B 7/06* (2006.01)
(Continued)

(52) U.S. Cl.
CPC .......... *H04W 48/16* (2013.01); *H04B 7/0602* (2013.01); *H04W 28/0215* (2013.01); *H04W 72/51* (2023.01)

(58) Field of Classification Search
CPC . H04W 48/16; H04W 28/0215; H04W 72/51; H04W 8/24; H04B 7/0602;
(Continued)

(56) References Cited

U.S. PATENT DOCUMENTS

2011/0243079 A1 10/2011 Chen et al.
2014/0219124 A1 8/2014 Chang et al.
(Continued)

FOREIGN PATENT DOCUMENTS

| CN | 1380778 A | 11/2002 |
|---|---|---|
| CN | 1684450 A | 10/2005 |

(Continued)

OTHER PUBLICATIONS

3GPP TSG-RAN WG1 #89; R1-1708686; Source: Ericsson; Title: On CSI acquisition for reciprocity-based operation; Hangzhou, China, May 15-19, 2017 (Year: 2017).*

(Continued)

*Primary Examiner* — Mohammed S Chowdhury
(74) *Attorney, Agent, or Firm* — Ladas & Parry LLP

(57) ABSTRACT

The present application relates to a method for indicating an antenna switching capability, a terminal device and a communication device, where the method includes: sending, by a first terminal device, a first UE capability, where the first UE capability indicates at least one antenna switching capability supported by the first terminal device; at least part of the at least one antenna switching capability supports that the first terminal device has more than 4 receiving antennas. Embodiments of the present application can achieve indication of an antenna switching capability for a terminal device with more (such as more than 4) receiving antennas.

17 Claims, 11 Drawing Sheets

(51) Int. Cl.
*H04W 28/02* (2009.01)
*H04W 72/51* (2023.01)

(58) Field of Classification Search
CPC .. H04B 7/0628; H04B 7/0691; H04B 7/0874; H04B 7/0404; H04B 7/0456; H04B 7/0617; H04B 7/0805; H04L 5/0091; H04L 25/0226; H04L 5/0023; H04L 5/0051; Y02D 30/70
See application file for complete search history.

(56) References Cited

U.S. PATENT DOCUMENTS

| | | | |
|---|---|---|---|
| 2015/0195027 A1 | 7/2015 | Jung et al. | |
| 2019/0253214 A1 | 8/2019 | Liu et al. | |
| 2020/0204323 A1* | 6/2020 | Kim | H04L 5/0048 |
| 2021/0112498 A1* | 4/2021 | Duan | H04L 5/0023 |
| 2023/0047048 A1* | 2/2023 | Liu | H04B 7/0417 |
| 2023/0058830 A1* | 2/2023 | Zhang | H04L 5/0051 |

FOREIGN PATENT DOCUMENTS

| | | |
|---|---|---|
| CN | 109391449 A | 2/2019 |
| CN | 109600794 A | 4/2019 |
| CN | 109644038 A | 4/2019 |
| CN | 109802801 A | 5/2019 |
| CN | 110035427 A | 7/2019 |
| CN | 110071749 A | 7/2019 |
| CN | 110199537 A | 9/2019 |
| CN | 110446231 A | 11/2019 |
| CN | 110536456 A | 12/2019 |
| EP | 3661097 A1 | 6/2020 |
| EP | 3817243 A1 | 5/2021 |
| WO | 2019022329 A1 | 1/2019 |
| WO | 2020001517 A1 | 1/2020 |

OTHER PUBLICATIONS

3GPP TSG RAN WG1 Meeting #92bis; R1-1805278; Source: Qualcomm Incorporated; Title: SRS antenna switching for 1T4R and 2T4R; Sanya, China, Apr. 16-20, 2018 (Year: 2018).*

International Search Report (ISR) dated Nov. 9, 2020 for Application No. PCT/CN2020/075904.

Written Opinion (WOSA) dated Nov. 9, 2020 for Application No. PCT/CN2020/075904.

The first Office Action of corresponding European application No. 20920688.7, dated Sep. 5, 2023.

The EESR of corresponding European application No. 20920688.7, dated Dec. 8, 2022.

Huawei, HiSilicon, Further discussion on the MIMO layer adaptation, R2-1913789, 3GPP TSG-RAN2 Meeting#107bis, Chongqing, China, Oct. 14-18, 2019.

Huawei, HiSilicon, UE dynamic adaptation to the maximum number of MIMO layer, RI-1912916, 3GPP TSG RAN WGI Meeting #99, Reno, USA, Nov. 18-22, 2019.

Huawei, HiSilicon, UE dynamic adaptation to the maximum number of MIMO layer, RI-1910078, 3GPP TSG RAN WGI Meeting #98bis, Chongqing, China, Oct. 14-20, 2019.

The first Office Action of corresponding Chinese application No. 202211543416.9, dated Jun. 28, 2024.

* cited by examiner

A first terminal device sends a first UE capability, where the first UE capability indicates at least one antenna switching capability supported by the first terminal device; at least part of the at least one antenna switching capability supports that the first terminal device has more than 4 receiving antennas —S210

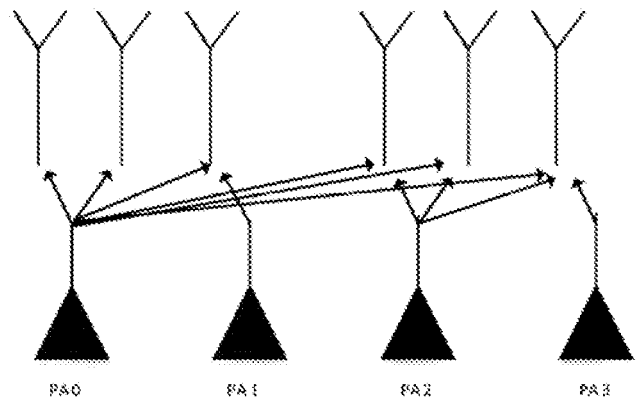
FIG. 20
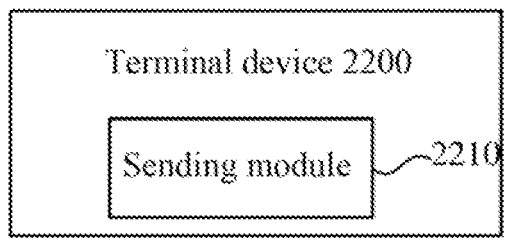
FIG. 21
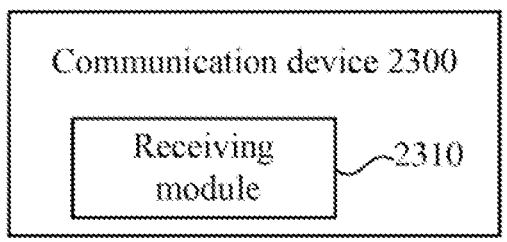
FIG. 22
FIG. 23

METHOD FOR INDICATING ANTENNA SWITCHING CAPABILITY, TERMINAL DEVICE AND COMMUNICATION DEVICE

CROSS-REFERENCE TO RELATED APPLICATION

This application is a continuation of International Application No. PCT/CN2020/075904, filed on Feb. 19, 2020, the content of which is incorporated herein by reference in its entirety.

TECHNICAL FIELD

The present application relates to the field of communication and, in particular, to a method for indicating an antenna switching capability, a terminal device and a communication device.

BACKGROUND

Multiple-input multiple-output (MIMO) technology is widely used in wireless communication systems. Using MIMO technology, various forms of gains can be obtained, such as a spatial diversity gain, a beamforming gain (also known as a precoding gain), a spatial multiplexing gain and so on. In order to obtain the beamforming gain/precoding gain or the spatial multiplexing gain, a sending end needs to determine a beamforming matrix/precoding matrix for signal transmission. For determining the beamforming matrix/precoding matrix of a terminal, a basic requirement is to obtain some forms of channel information of a transmission channel corresponding to the terminal.

In an actual system, in order to obtain the channel information of the transmission channel of the terminal, a channel reciprocity method can be adopted; this method requires the terminal to report its antenna switching capability to a base station, receive a configuration message from the base station, and then use the configuration message to send a sounding reference signal (SRS). Configuration information is related to an antenna switching configuration of the terminal. The antenna switching capability may be represented by xTyR or txry, where x and y are positive integers, specifically representing that the SRS can be transmitted through x antenna ports, and y corresponds to the number of at least part of receiving antennas of the terminal. At present, as the device size of the terminal increases, the terminal may adopt more receiving antennas to improve a downlink receiving capability. A value of y in the antenna switching capability xTyR of such terminal is relatively large (for example, y is greater than 4), and such terminal may also have multiple different antenna switching capabilities. For these terminal with more e.g. more than 4) receiving antennas, there is currently no suitable method to report UE antenna switching capability.

SUMMARY

Embodiments of the present application provide a method for indicating an antenna switching capability, a terminal device and a communication device. For a terminal device with more (e.g. more than 4) receiving antennas, indication of an antenna switching capability can be achieved.

An embodiment of the present application provides a method for indicating an antenna switching capability, including:

sending, by a first terminal device, a first user equipment (UE) capability, where the first UE capability indicates at least one antenna switching capability supported by the first terminal device; at least part of the at least one antenna switching capability supports that the first terminal device has more than 4 receiving antennas.

An embodiment of the present application further provides a method for indicating an antenna switching capability, including:

receiving, by a communication device, a first UE capability, where the first UE capability indicates at least one antenna switching capability supported by a first terminal device; at least part of the at least one antenna switching capability supports that the first terminal device has more than 4 receiving antennas.

An embodiment of the present application provides a terminal device, including:

a sending module, configured to send a first UE capability, where the first UE capability indicates at least one antenna switching capability supported by the terminal device; at least part of the at least one antenna switching capability supports that the terminal device has more than 4 receiving antennas.

An embodiment of the present application provides a communication device, including:

a receiving module, configured to receive a first UE capability, where the first UE capability indicates at least one antenna switching capability supported by a first terminal device; at least part of the at least one antenna switching capability supports that the first terminal device has more than 4 receiving antennas.

An embodiment of the present application provides a terminal device, including a processor and a memory. The memory is configured to store a computer program, and the processor is configured to call and run the computer program stored in the memory to execute the above-mentioned method for indicating an antenna switching capability.

An embodiment of the present application provides a communication device, including a processor and a memory. The memory is configured to store a computer program, and the processor is configured to call and run the computer program stored in the memory to execute the above-mentioned method for indicating an antenna switching capability.

An embodiment of the present application provides a chip for implementing the above-mentioned method for indicating an antenna switching capability.

Specifically, the chip includes: a processor, configured to call and run a computer program from a memory to cause a device on which the chip is installed to execute the above-mentioned method for indicating an antenna switching capability.

An embodiment of the present application provides a computer-readable storage medium for storing a computer program, where the computer program causes a computer to execute the above-mentioned method for indicating an antenna switching capability.

An embodiment of the present application provides a computer program product, including computer program instructions, where the computer program instructions cause a computer to execute the above-mentioned method for indicating an antenna switching capability.

An embodiment of the present application provides a computer program which, when running on a computer, causes the computer to execute the above-mentioned method for indicating an antenna switching capability.

In the embodiments of the present application, by sending the first UE capability by the terminal device, and indicating at least one antenna switching capability supported by the terminal device in the first UE capability, indication of the antenna switching capability can be achieved for the terminal device with more (such as more than 4) receiving antennas.

BRIEF DESCRIPTION OF DRAWINGS

FIG. 20 is a schematic diagram of a hardware implementation of a terminal device applied according to Embodiment 18 of the present application.

FIG. 21 is a flowchart for implementing a method for indicating an antenna switching capability according to an embodiment of the present application.

FIG. 22 is a schematic structural diagram of a terminal device 2200 according to an embodiment of the present application.

FIG. 23 is a schematic structural diagram of a communication device 2300 according to an embodiment of the present application.

DESCRIPTION OF EMBODIMENTS

Figures 1, 2:
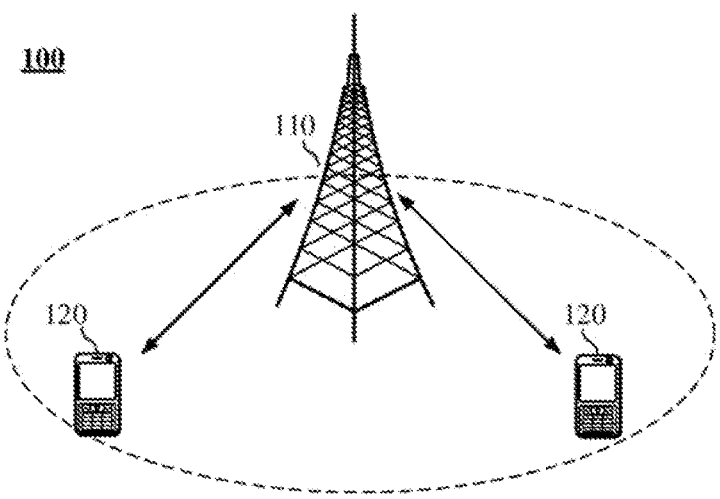
FIG. 1 is a schematic diagram of an application scenario of an embodiment of the present application.
FIG. 2 is a flowchart for implementing a method for indicating an antenna switching capability according to an embodiment of the present application.

The technical solutions in embodiments of the present application will be described with reference to accompanying drawings in the embodiments of the present application.

The technical solutions of the embodiments of the present application can be applied to various communication systems, such as a global system of mobile communication (GSM), a code division multiple access (CDMA) system, a wideband code division multiple access (WCDMA) system, a general packet radio service (GPRS), a long term evolution (LTE) system, an advanced long term evolution (LTE-A) system, a new radio (NR) system, an evolution system of NR system, an LTE-based access to unlicensed spectrum (LTE-U) system, an NR-based access to unlicensed spectrum (NR-U) system, a universal mobile telecommunications system (UMTS), a wireless local area network (WLAN), a wireless fidelity (WiFi), a 5th-generation (5G) system or other communication systems.

Generally speaking, traditional communication systems support a limited number of connections and are easy to implement. However, with the development of communication technology, a mobile communication system will not only support traditional communication, but also support, for example, device to device (D2D) communication, machine to machine (M2M) communication, machine type communication (MTC), vehicle to vehicle (V2V) communication and so on. The embodiments of the present application can also be applied to these communication systems.

In an implementation, a communication system in the embodiments of the present application can be applied to a carrier aggregation (CA) scenario, a dual connectivity (DC) scenario and a standalone (SA) network deployment scenario.

The embodiments of the present application do not impose limitation on an applied spectrum. For example, the embodiments of the present application may be applied to a licensed spectrum, and may also be applied to an unlicensed spectrum.

The embodiments of the application describe various embodiments in conjunction with a network device and a terminal device, where: the terminal device may also be referred to a user equipment (UE), an access terminal, a subscriber unit, a subscriber station, a mobile station, a mobile radio station, a remote station, a remote terminal, a mobile device, a user terminal, a terminal, a wireless communication device, a user agent or a user apparatus, etc. The terminal device may be a station (ST) in WLAN, a cellular telephone, a cordless telephone, a session initiation protocol (SIP) telephone, a wireless local loop (WLL) station, a personal digital assistant (PDA) device, a handheld device with wireless communication function, a computing device with wireless communication function or other processing devices connected to a wireless modem, an in-vehicle device, a wearable device, a terminal device in a next-generation communication system, such as an NR network, or a terminal device in a future evolved public land mobile network PLMN).

As an example rather than a limitation, in the embodiments of the present application, the terminal device may also be a wearable device. The wearable device may also be called a wearable smart device, which is a general name of wearable devices that are developed by performing intelligent design on daily wear using wearable technology, such as glasses, gloves, watches, clothing and shoes. The wearable device is a portable device that is worn directly on a body or integrated into a user's clothing or accessories. The wearable device is not only a hardware device, but also realizes powerful functions through software support, data interaction and cloud interaction. In a broad sense, wearable smart devices include those full-featured and large-sized with complete or partial functions being achieved without relying on smart phones, such as smart watches or smart glasses, and those focusing on only a certain type of application functions and needing to be used in cooperation with other devices such as smart phones, such as various kinds of smart bracelets and smart jewelry for physical sign monitoring.

The network device may be a device used to communicate with a mobile device. The network device may be an access point (AP) in WLAN, a base transceiver station (BTS) in GSM or CDMA, a base station (NodeB, NB) in WCDMA, an evolutional base station (Evolutional Node B, eNB or eNodeB) in LTE, a relay station or an access point, or an in-vehicle device, a wearable device and a network device (gNB) in an NR network or a network device in future evolved PLMN.

In the embodiments of the present application, the network device provides services for a cell, and the terminal device communicates with the network device through transmission resources (e.g. frequency domain resources, or spectrum resources) used by the cell. The cell may be a cell corresponding to the network device (e.g. a base station), and the cell may belong to a macro base station or a base station corresponding to a small cell. The small cell here may include: a metro cell, a micro cell, a pico cell, a femto cell, etc. These small cells have characteristics of small coverage and low transmit power, and are suitable for providing high-speed data transmission services.

FIG. 1 exemplarily shows one network device 110 and two terminal devices 120. In an implementation, a wireless communication system 100 may include multiple network devices 110, and other numbers of terminal devices 120 may be included within a coverage of each network device 110, which is not limited in the embodiments of the present application.

In an implementation, the wireless communication system 100 may further include other network entities such as a mobility management entity (MME), an access and mobility management function (AMF), which is not limited in the embodiments of the present application.

It should be understood that the terms "system" and "network" are often used interchangeably herein. The term "and/or" herein is only an association relationship for describing associated objects, which means that there can be three kinds of relationships. For example, "A and/or B" can mean that there are three situations: A exists alone, A and B exist at the same time, and B exists alone. In addition, the character "/" herein generally means that associated objects before and after the character are in an "or" relationship. The "beamforming" and "precoding" herein can often be used interchangeably. For simplicity of description, when x=y, "xTyR" herein also includes "xT=yR". At the same time, in some places, "xTyR" can also be represented by "txry".

An embodiment of the present application proposes a method for indicating an antenna switching capability. FIG. 2 is a flowchart for implementing a method 200 for indicating an antenna switching capability according to an embodiment of the present application, including:

S210: a first terminal device sends a first UE capability, where the first UE capability indicates at least one antenna switching capability supported by the first terminal device; at least part of the at least one antenna switching capability supports that the first terminal device has more than 4 receiving antennas.

In an implementation, the antenna switching capability is represented by xTyR, where the xTyR represents that a sounding reference signal (SRS) supports transmission through x antenna ports, y corresponds to the number of all or part of receiving antennas of the first terminal device, y of at least part of xTyR is greater than 4, x and y are positive integers.

In an implementation, an antenna port may refer to a transmitting antenna.

In an implementation, that the first terminal device sends the first UE capability includes that:

the first terminal device sends the first UE capability through a first radio resource control (RRC) signaling;

or, the first terminal device sends the first DE capability through a second RRC signaling and a third RRC signaling, where the second RRC signaling indicates a first subset of the at least one antenna switching capability, and the third RRC signaling indicates a second subset of the at least one antenna switching capability; the first subset and the second subset include different antenna switching capabilities, and a union of the first subset and the second subset includes the at least one antenna switching capability indicated by the first UE capability.

In an implementation, that the first terminal device sends the first UE capability through the first RRC signaling includes that:

the first RRC signaling carries xTyR corresponding to all of the antenna switching capability indicated by the first UE capability; or, the first RRC signaling carries xTyR corresponding to part of antenna switching capabilities indicated by the first UE capability.

In an implementation, in a case that the first RRC signaling carries xTyR corresponding to part of the antenna switching capabilities indicated by the first UE capability, the first UE capability includes an antenna switching capability corresponding to xTyR carried by the first RRC signaling and an antenna switching capability determined according to a predetermined rule.

In an implementation, that the first terminal device sends the first UE capability through the second RRC signaling and the third RRC signaling includes that:

the second RRC signaling carries xTyR corresponding to all of an antenna switching capability in the first subset, and the third RRC signaling carries xTyR corresponding to all of an antenna switching capability in the second subset; or, the second RRC signaling carries xTyR corresponding to all of an antenna switching capability in the first subset, and the third RRC signaling carries xTyR corresponding to part of antenna switching capabilities in the second subset; or, the second RRC signaling carries xTyR corresponding to part of antenna switching capabilities in the first subset, and the third RRC signaling carries xTyR corresponding to part of an antenna switching capability in the second subset; or, the second RRC signaling carries xTyR corresponding to part of antenna switching capabilities in the first subset, and the third RRC signaling carries xTyR corresponding to part of antenna switching capabilities in the second subset.

In an implementation, in a case that the second RRC signaling carries xTyR corresponding to part of the antenna switching capabilities in the first subset, the first subset includes an antenna switching capability corresponding to xTyR carried by the second RRC signaling and an antenna switching capability determined according to a predetermined rule;

in a case that the third RRC signaling carries xTyR corresponding to part of the antenna switching capabilities in the second subset, the second subset includes an antenna switching capability corresponding to xTyR carried by the third RRC signaling and an antenna switching capability determined according to a predetermined rule.

In the above manners, the terminal device can flexibly indicate its own antenna switching capability, so as to obtain greater flexibility, which is conducive to a development and implementation of a terminal product. In addition, the terminal device can carry, in the RRC signaling, xTyR corresponding to only the reported part of the antenna switching capabilities, and an opposite end device can determine other antenna switching capabilities other than the antenna switching capabilities corresponding to these xTyR, according to the preset rule, which can make some trade-offs between flexibility and overhead of signalings. On the one hand, better flexibility can be achieved for the UE, and on the other hand, reporting is not required for the easiest or usual capability, thereby saving signaling overhead.

In an implementation, that y of at least one xTyR is greater than 4 includes that:

there is at least one xTyR with y being one of 6 and 8; or, there is at least one xTyR with y being 8.

In an implementation, that the first terminal device sends the first UE capability includes that: the first terminal device sends the first UE capability to a communication device, where the communication device is a network device or a second terminal device. Therefore, the embodiment of the present application can better support a communication between terminals.

In an implementation, the method for indicating an antenna switching capability further includes:

the first terminal device receives a configuration message corresponding to the at least one antenna switching capability indicated by the first UE capability;

where the configuration message indicates at least one SRS resource group set, each of the SRS resource group set includes at least one SRS resource group, and each of the SRS resource group includes at least one SRS resource; each of the SRS resource group set corresponds to an antenna switching capability represented by same or different xTyR.

In an implementation, in a case that multiple SRS resources in one SRS resource group are transmitted on a same time slot, the first terminal device does not transmit other signals on Y symbols between adjacent SRS resources, where Y is a positive integer.

The above Y may correspond to different values according to different subcarrier spacings, that is, a value of Y is determined according to a subcarrier spacing.

In an implementation, the value of Y may be specified in a protocol.

In an implementation, for part of subcarrier spacings, the value of Y is determined according to the first UE capability reported by the first terminal device; for the other part of subcarrier spacings, the value of Y may be specified in the protocol. On the one hand, this manner can reduce a guard spacing and reduce system consumption for a UE with strong capability; on the other hand, implementation complexity and/or cost of a UE with low capability can be reduced, which facilitates a promotion of the UE with low capability.

In an implementation, the SRS resource occupies all or part of symbols in a time slot, for example, at least one symbol of last 6 symbols in a time slot may be occupied.

In an implementation, a symbol occupied by the SRS resource is determined according to a second UE capability reported by the first terminal device. In this way, for UEs with different capabilities, different resources can be allocated, so that an SRS capacity can be improved.

In an implementation, the second UE capability is used to indicate available symbol information that is available to the first terminal device for an SRS resource configuration in a time slot. For example, it is indicated that all 14 symbols in a time slot can support SRS resource configuration, or it is indicated that last 8 symbols in a time slot can support SRS resource configuration.

In a case that the first terminal device does not report the second UE capability, the SRS resource included in the SRS resource group occupies at least one symbol of last 6 symbols in a time slot. That is, when the UE does not report a stronger capability, a capability supported by the terminal in an existing protocol is used by default.

In an implementation, a usage field in an RRC information element (IE) corresponding to the SRS resource group is configured as antenna switching.

In an implementation, resource type fields corresponding to at least two SRS resource groups in an SRS resource group set are configured with a same value.

In an implementation, the resource type field may be configured as one of the following: aperiodic, semi-persistent, and periodic.

In an implementation, if the resource type field corresponding to the SRS resource group in the SRS resource group set is configured as periodic or semi-persistent, then the SRS resource group set contains one SRS resource group.

In an implementation, a subcarrier spacing corresponding to the SRS resource is:

one of 15 kHz, 30 kHz, 60 kHz and 120 kHz; or one of 15 kHz, 30 kHz, 60 kHz, 120 kHz, 240 kHz, 480 kHz, 960 kHz and 1920 kHz; or, one of 15 kHz, 30 kHz, 60 kHz, 120 kHz, 240 kHz, 480 kHz and 960 kHz; or, one of 15 kHz, 30 kHz, 60 kHz, 120 kHz, 240 kHz and 480 kHz; or, one of 15 kHz, 30 kHz, 60 kHz, 120 kHz and 240 kHz.

In this way, communication on high frequency bands can be better supported.

In an implementation, in a case that the subcarrier spacing is greater than a first threshold, the first terminal device does not support an antenna switching capability corresponding to xTyR (y>4); or, in a case that the subcarrier spacing is greater than a first threshold, the first terminal device does not support an antenna switching capability corresponding to xTyR (y>6).

In an implementation, the first threshold corresponds to a subcarrier spacing of 120 kHz.

In this way, after considering analog beamforming in a high frequency band, the number of receiving antennas visible in a digital domain will not be very large. Through this limitation, complexity of a protocol design can be greatly reduced.

In an implementation, part or all of the following power parameters corresponding to multiple SRS resource groups in a same SRS resource group set are the same:
alpha;
p0;
path loss reference signal,
SRS power control adjustment states, In an implementation, SRS ports of the at least one SRS resource included in a same SRS resource group set correspond to different antenna ports of the first terminal device.

In an implementation, the method for indicating an antenna switching capability further includes that: the first terminal device sends an SRS signal according to the configuration message. Accordingly, the network device or the second terminal device receives the SRS signal sent by the first terminal device. Then the network device or the second terminal device makes measurement according to the received SRS signal to determine a precoding matrix corresponding to the first terminal device, and transmits a corresponding physical downlink shared channel (PDSCH) or physical downlink control channel (PDCCH) or other channels or signals.

Specific embodiments are given below to introduce contents that the first UE capability can indicate for terminal devices implemented by different hardware.

Embodiment 1

Figure 3:
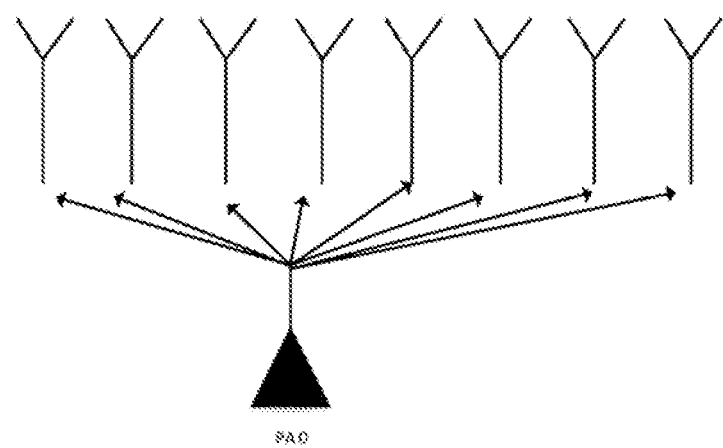
FIG. 3 is a schematic diagram of a hardware implementation of a terminal device applied according to Embodiment 1 of the present application.

FIG. 3 is a schematic diagram of a hardware implementation of a terminal device applied according to Embodiment 1 of the present application. It can be seen from FIG. 3 that the terminal device adopts 1 transmitting antenna and 8 receiving antennas, and the supported maximum capability is 1T8R. PA0 in FIG. 3 is a power amplifier of the transmitting antenna. The terminal device also supports other "fallback capabilities", such as 1T4R, 1T2R and so on. The terminal device sends a first UE capability to a network device or other terminal devices, where the first UE capability includes at least one antenna switching capability supported by the terminal device.

The antenna switching capability or configuration may also be represented by txry. In this embodiment and subsequent embodiments, the antenna switching capability or configuration will be represented by two ways of xTyR and txry.

As shown in FIG. 3, the maximum capability supported by the terminal device applied in this embodiment is: xTyR=1T8R (txry=t1r8, x=1, y=8). The first UE capability may take the following forms.

Mode 1
The first UE capability indicates the following antenna switching capabilities:
1T1R, 1T2R, 1T4R, 1T8R (t1r1, t1r2, t1r4, t1r8).

For this mode, one RRC signaling (such as the above first RRC signaling) may be used for reporting.

A possible solution is that the RRC signaling carries all of the antenna switching capabilities indicated by the first UE capability, that is, reporting antenna switching capabilities: 't1r1-t1r2-t1r4-t1r8'. The embodiment of the present application does not limit an order of antenna switching capabilities carried in the RRC signaling, as long as these contents are included. The same is true in the following embodiments, which will not be repeated.

Another possible solution is that the RRC signaling carries part of the antenna switching capabilities indicated by the first UE capability, such as reporting antenna switching capabilities: 't1r2-t1r4-t1r8'. In this manner, an opposite end device may determine other antenna switching capabilities indicated by the first UE capability according to a predetermined rule. For example, in this embodiment, the opposite end may determine t1r1.

In an implementation, for an antenna switching capability possessed by the terminal device by default, the RRC signaling may not carry xTyR or txry corresponding to the antenna switching capability; the opposite end device can determine that the first UE capability includes the antenna switching capability that is possessed by default. The antenna switching capability possessed by the terminal device by default may be specified by a preset rule.

Or, two RRC signalings (such as the above second RRC signaling and third RRC signaling) can be used for reporting. The second RRC signaling and the third RRC signaling may respectively indicate a subset of the first UE capability, and the two subsets may be completely or partially different; a union of the two subsets can include the first UE capability. Similar to the reporting manner of the first RRC signaling, the second RRC signaling and the third RRC signaling may also carry all or part of the subset indicated by them.

For example, for this embodiment, RRC signaling 1 and RRC signaling 2 may be used for joint reporting, where,
RRC signaling 1 reports an antenna switching capability: 't1r4';
RRC signaling 2 reports antenna switching capabilities: 't1r1-t1r2-t1r8', or,
RRC signaling 1 reports the antenna switching capability: 't1r4';
RRC signaling 2 reports antenna switching capabilities: 't1r2-t1r8'.

Of course, there are other reporting manners, which are not exhaustive in this embodiment.

Mode 2
The first UE capability indicates part of the following antenna switching capabilities (including at least t1r8): 1T1R, 1T2R, 1T4R, 1T8R (t1r1, t1r2, t1r4, t1r8).

For example, the first UE capability indicates the following antenna switching capabilities:
1T1R, 1T2R, 1T8R (t1r1, t1r2, t1r8).

If one RRC signaling is used for reporting, a possible solution is that the RRC signaling carries all of the antenna switching capabilities indicated by the first UE capability, that is, reporting antenna switching capabilities: 't1r1-t1r2-t1r8'.

Another possible solution is that the RRC signaling carries part of the antenna switching capabilities indicated by the first UE capability, such as reporting antenna switching capabilities: 't1r2-t1r8'. In this manner, the opposite end device may determine other antenna switching capabilities indicated by the first UE capability according to a predetermined rule. For example, in this embodiment, the opposite end may determine t1r1.

Mode 3
The first UE capability indicates all or part of the following antenna switching capabilities (including at least t1r8):
1T1R, 1T2R, 1T4R, 1T6R, 1T8R (t1r1, t1r2, t1r4, t1r6, t1r8).

Mode 4

The first UE capability indicates all or part of the following antenna switching capabilities (including at least t1r8):

1T1R, 1T2R, 1T3R, 1T4R, 1T5R, 1T6R, 1T7R, 1T8R (t1r1, t1r2, t1r3, t1r4, t1r5, t1r6, t1r7, t1r8).

Embodiment 2

Figure 4:
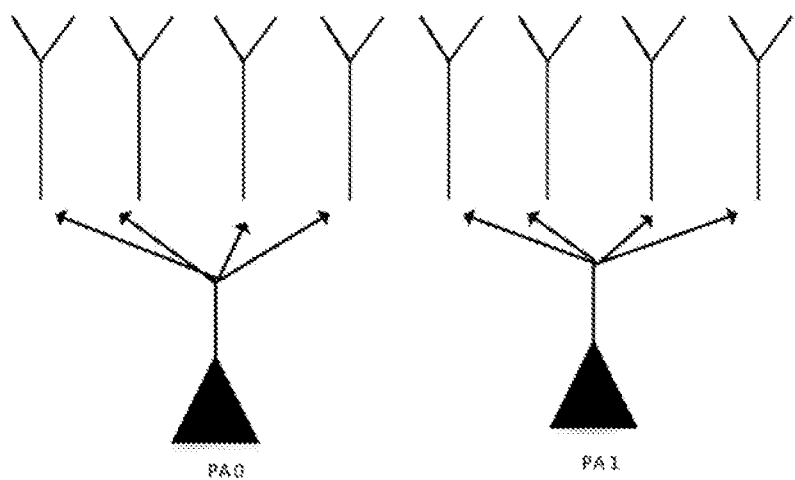
FIG. 4 is a schematic diagram of a hardware implementation of a terminal device applied according to Embodiment 2 of the present application.

FIG. 4 is a schematic diagram of a hardware implementation of a terminal device applied according to Embodiment 2 of the present application. It can be seen from FIG. 4 that the terminal device adopts 2 transmitting antennas and 2 receiving antennas, and the supported maximum capability is 2T8R. The terminal device also supports other "fallback capabilities", such as 1T4R, 1T2R and so on. The terminal device sends a first UE capability to a network device or other terminal devices, where the first UE capability includes at least one antenna switching capability supported by the terminal device.

As shown in FIG. 4, the maximum capability supported by the terminal device applied in this embodiment is: xTyR=2T8R (txry=t2r8, x=2, y=8). The first UE capability may take the following forms.

Mode 1

The first UE capability indicates the following antenna switching capabilities:

1T1R, 1T2R, 1T4R, 2T2R, 2T4R, 2T8R (t1r1, t1r2, t1r4, t2r2, t2r4, t2r8).

For this mode, one RRC signaling (such as the above first RRC signaling) may be used for reporting.

A possible solution is that the RRC signaling carries all of the antenna switching capabilities indicated by the first UE capability, that is, reporting antenna switching capabilities: 't1r1-t1r2-t1r4-t2r2-t2r4-t2r8'.

Another possible solution is that the RRC signaling carries part of the antenna switching capabilities indicated by the first UE capability, such as reporting antenna switching capabilities: 't1r2-t1r4-t2r2-t2r4-t2r8'. In this manner, an opposite end device may determine other antenna switching capabilities indicated by the first UE capability according to a predetermined rule. For example, in this embodiment, the opposite end may determine t1r1.

Mode 2

The first UE capability indicates part of the following antenna switching capabilities (including at least t2r8):

1T1R, 1T2R, 1T4R, 2T2R, 2T4R, 2T8R (t1r1, t1r2, t1r4, t2r2, t2r4, t2r8).

For example, the first UE capability indicates the following antenna switching capabilities:

1T1R, 1T2R, 1T4R, 2T8R (t1r1, t1r2, t1r4, t2r8).

If one RRC signaling is used for reporting, a possible solution is that the RRC signaling carries all of the antenna switching capabilities indicated by the first UE capability, that is, reporting antenna switching capabilities: 't1r1-t1r2-t1r4-t2r8'.

Another possible solution is that the RRC signaling carries part of the antenna switching capabilities indicated by the first UE capability, such as reporting antenna switching capabilities: 't1r2-t1r4-t2r8'. In this manner, the opposite end device may determine other antenna switching capabilities indicated by the first UE capability according to a predetermined rule. For example, in this embodiment, the opposite end may determine t1r1.

Mode 3

The first UE capability indicates all or part of the following antenna switching capabilities (including at least t2r8):

1T1R, 1T2R, 1T4R, 2T2R, 2T4R, 2T6R, 2T8R (t1r1, t1r2, t1r4, t2r2, t2r4, t2r6, t2r8).

Mode 4

The first UE capability indicates all or part of the following antenna switching capabilities (including at least t2r8):

1T1R, 1T2R, 1T3R, 1T4R, 2T2R, 2T4R, 2T6R, 2T8R (t1r1, t1r2, t1r3, t1r4, t2r2, t2r4, t2r6, t2r8).

Embodiment 3

Figure 5:
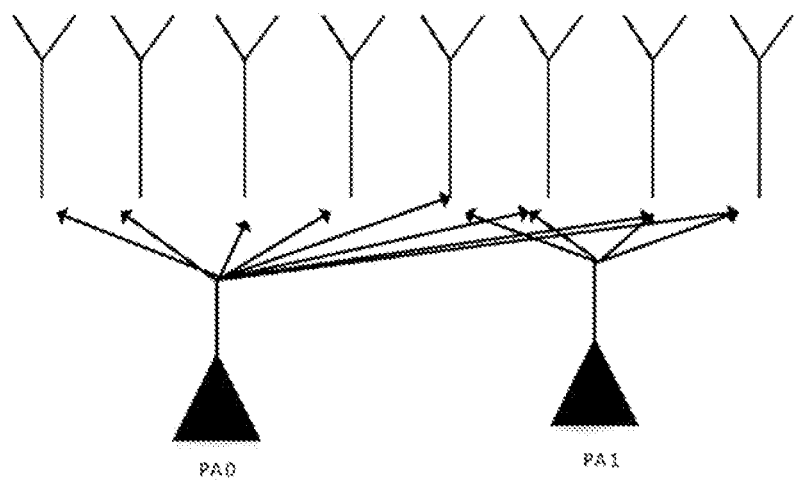
FIG. 5 is a schematic diagram of a hardware implementation of a terminal device applied according to Embodiment 3 of the present application.

FIG. 5 is a schematic diagram of a hardware implementation of a terminal device of another application according to an embodiment of the present application. It can be seen from FIG. 5 that the terminal device adopts 2 transmitting antennas and 8 receiving antennas, and the supported maximum capability is 2T8R. The terminal device also supports other "fallback capabilities", such as 1T4R, 1T2R and so on. The terminal device sends a first UE capability to a network device or other terminal devices, where the first UE capability includes at least one antenna switching capability supported by the terminal device.

As shown in FIG. 5, the maximum capability supported by the terminal device applied in this embodiment is: xTyR=2T8R (txry=t2r8, x=2, y=8). The first UE capability may take the following forms.

Mode 1

The first UE capability indicates the following antenna switching capabilities:

1T1R, 1T2R, 1T4R, 1T8R, 2T2R, 2T4R, 2T8R (t1r1, t1r2, t1r4, t1r8, t2r2, t2r4, t2r8).

For this mode, one RRC signaling (such as the above first RRC signaling) may be used for reporting.

A possible solution is that the RRC signaling carries all of the antenna switching capabilities indicated by the first UE capability, that is, reporting antenna switching capabilities: 't1r1-t1r2-t1r4-t1r8-t2r2-t2r4-t2r8'.

Another possible solution is that the RRC signaling carries part of the antenna switching capabilities indicated by the first UE capability, such as reporting antenna switching capabilities: 't1r2-t1r4-t1r8-t2r2-t2r4-t2r8'. In this manner, an opposite end device may determine other antenna switching capabilities indicated by the first UE capability according to a predetermined rule. For example, in this embodiment, the opposite end may determine t1r1.

Mode 2

The first UE capability indicates part of the following antenna switching capabilities (including at least t2r8):

1T1R, 1T2R, 1T4R, 1T8R, 2T2R, 2T4R, 2T8R (t1r1, t1r2, t1r4, t1r8, t2r2, t2r4, t2r8).

For example, the first UE capability indicates the following antenna switching capabilities:

1T1R, 1T2R, 1T4R, 1T8R, 2T8R (t1r1, t1r2, t1r4, t1r8, t2r8).

If one RRC signaling is used for reporting, a possible solution is that the RRC signaling carries all of the antenna switching capabilities indicated by the first UE capability, that is, reporting antenna switching capabilities: 't1r1-t1r2-t1r4-t1r8-t2r8'.

Another possible solution is that the RRC signaling carries part of the antenna switching capabilities indicated by the first UE capability, such as reporting antenna switching capabilities: 't1r2-t1r4-t1r8-t2r8'. In this manner, the opposite end device may determine other antenna switching capabilities indicated by the first UE capability according to a predetermined rule. For example, in this embodiment, the opposite end may determine t1r1.

Mode 3

The first UE capability indicates all or part of the following antenna switching capabilities (including at least t2r8);

1T1R, 1T2R, 1T4R, 1T6R, 1T8R, 2T2R, 2T4R, 2T6R, 2T8R (t1r1, t1r2, t1r4, t1r6, t1r8, t2r2, t2r4, t2r6, t2r8).

Mode 4

The first UE capability indicates all or part of the following antenna switching capabilities (including at least t2r8):

1T1R, 1T2R, 1T3R, 1T4R, 1T5R, 1T6R, 1T7R, 1T8R, 2T2R, 2T4R, 2T6R, 2T8R (t1r1, t1r2, t1r3, t1r4, t1r5, t1r6, t1r7, t1r8, t2r2, t2r4, t2r6, t2r8).

Embodiment 4

Figure 6:
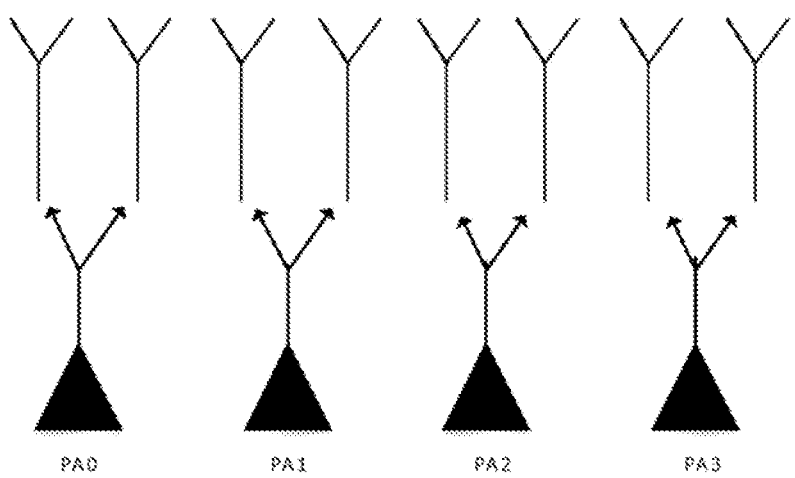
FIG. 6 is a schematic diagram of a hardware implementation of a terminal device applied according to Embodiment 4 of the present application.

FIG. 6 is a schematic diagram of a hardware implementation of a terminal device of another application according to an embodiment of the present application. It can be seen from FIG. 6 that the terminal device adopts 4 transmitting antennas and 8 receiving antennas, and the supported maximum capability is 4T8R. The terminal device also supports other "fallback capabilities", such as 1T4R, 2T2R and so on. The terminal device sends a first UE capability to a network device or other terminal devices, where the first UE capability includes at least one antenna switching capability supported by the terminal device.

The antenna switching capability or configuration may also be represented by txry. In this embodiment and subsequent embodiments, the antenna switching capability or configuration will be represented by two ways of xTyR and txry.

As shown in FIG. 6, the maximum capability supported by the terminal device applied in this embodiment is: xTyR=4T8R (txry=t4r8, x=4, y=8). The first UE capability may take the following forms.

Mode 1

The first UE capability indicates the following antenna switching capabilities:

1T1R, 1T2R, 2T2R, 2T4R, 4T4R, 4T8R (t1r1, t1r2, t2r2, t2r4, t4r4, t4r8).

For this mode, one RRC signaling (such as the above first RRC signaling) may be used for reporting.

A possible solution is that the RRC signaling carries all of the antenna switching capabilities indicated by the first UE capability, that is, reporting antenna switching capabilities: 't1r1-t1r2-t2r2-t2r4-t4r4-t4r8'.

Another possible solution is that the RRC signaling carries part of the antenna switching capabilities indicated by the first UE capability; such as reporting antenna switching capabilities: 't1r2-t2r2-t2r4-t4r4-t4r8'. In this manner, an opposite end device may determine other antenna switching capabilities indicated by the first UE capability according to a predetermined rule. For example, in this embodiment, the opposite end may determine t1r1.

Mode 2

The first UE capability indicates part of the following antenna switching capabilities (including at least t4r8):

1T1R, 1T2R, 2T2R, 2T4R, 4T4R, 4T8R (t1r1, t1r2, t2r2, t2r4, t4r4, t4r8).

For example, the first UE capability indicates the following antenna switching capabilities:

1T1R, 1T2R, 2T2R, 2T4R, 4T8R (t1r1, t1r2, t2r2, t2r4, t4r8).

If one RRC signaling is used for reporting, a possible solution is that the RRC signaling carries all of the antenna switching capabilities indicated by the first UE capability, that is, reporting antenna switching capabilities: 't1r1-t1r2-t2r2-t2r4-t4r8'.

Another possible solution is that the RRC signaling carries part of the antenna switching capabilities indicated by the first UE capability, such as reporting antenna switching capabilities: 't1r2-t2r2-t2r4-t4r8'. In this manner, the opposite end device may determine other antenna switching capabilities indicated by the first UE capability according to a predetermined rule. For example, in this embodiment, the opposite end may determine t1r1.

Embodiment 5

Figure 7:
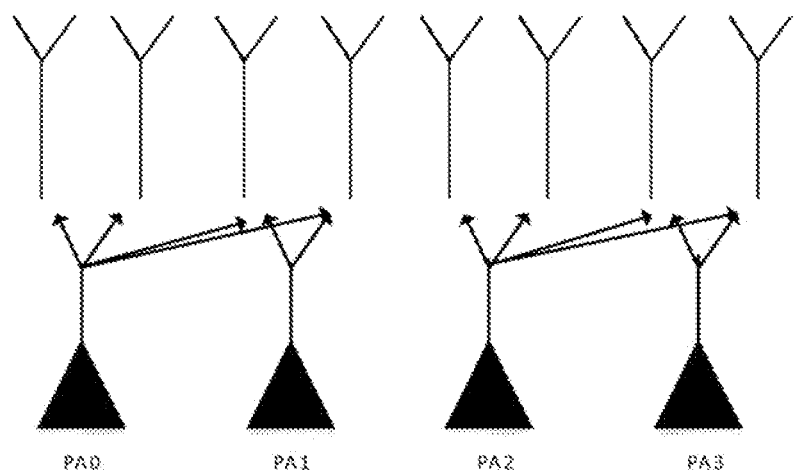
FIG. 7 is a schematic diagram of a hardware implementation of a terminal device applied according to Embodiment 5 of the present application.

FIG. 7 is a schematic diagram of a hardware implementation of a terminal device of another application according to an embodiment of the present application. It can be seen from FIG. 7 that the terminal device adopts 4 transmitting antennas and 8 receiving antennas, and the supported maximum capability is 4T8R. The terminal device also supports other "fallback capabilities", such as 1T4R, 1T2R and so on. The terminal device sends a first UE capability to a network device or other terminal devices, where the first UE capability includes at least one antenna switching capability supported by the terminal device.

The antenna switching capability or configuration may also be represented by txry. In this embodiment and subsequent embodiments, the antenna switching capability or configuration will be represented by two ways of xTyR and txry.

As shown in FIG. 7, the maximum capability supported by the terminal device applied in this embodiment is: xTyR=4T8R (txry=t4r8, x=4, y=8). The first UE capability may take the following forms.

Mode 1

The first UE capability indicates the following antenna switching capabilities:

1T1R, 1T2R, 1T4R, 2T2R, 2T4R, 2T8R, 4T4R, 4T8R (t1r1, t1r2, t1r4, t2r2, t2r4, t2r8, t4r4, t4r8).

For this mode, one RRC signaling (such as the above first RRC signaling) may be used for reporting.

A possible solution is that the RRC signaling carries all of the antenna switching capabilities indicated by the first UE capability, that is, reporting antenna switching capabilities: 't1r1-t1r2-t1r4-t2r2-t2r4-t2r8-t4r4-t4r8'.

Another possible solution is that the RRC signaling carries part of the antenna switching capabilities indicated by the first UE capability, such as reporting antenna switching capabilities: 't1r2-t1r4-t2r2-t2r4-t2r8-t4r4-t4r8'. In this manner, an opposite end device may determine other antenna switching capabilities indicated by the first UE capability according to a predetermined rule. For example, in this embodiment, the opposite end may determine t1r1.

Mode 2

The first UE capability indicates part of the following antenna switching capabilities (including at least t4r8):

1T1R, 1T2R, 1T4R, 2T2R, 2T4R, 2T8R, 4T4R, 4T8R (t1r1, t1r2, t1r4, t2r2, t2r4, t2r8, t4r4, t4r8).

For example, the first UE capability indicates the following antenna switching capabilities:

1T1R, 1T2R, 2T2R, 1T4R, 2T4R, 4T8R (t1r1, t1r2, t2r2, t1r4, t2r4, t4r8).

If one RRC signaling is used for reporting, a possible solution is that the RRC signaling carries all of the antenna switching capabilities indicated by the first UE capability, that is, reporting antenna switching capabilities; 't1r1-t1r2-t2r2-t1r4-t2r4-t4r8'.

Another possible solution is that the RRC signaling carries part of the antenna switching capabilities indicated by the first UE capability, such as reporting antenna switching capabilities: 't1r2-t2r2-t1r4-t2r4-t4r8'. In this manner, the opposite end device may determine other antenna switching capabilities indicated by the first UE capability according to a predetermined rule. For example, in this embodiment, the opposite end may determine t1r1.

Or, the first UE capability indicates the following antenna switching capabilities:

1T1R, 1T2R, 2T2R, 1T4R, 2T4R, 2T8R, 4T8R (t1r1, t1r2, t2r2, t1r4, t2r4, t2r8, t4r8).

If one RRC signaling is used for reporting, a possible solution is that the RRC signaling carries all of the antenna switching capabilities indicated by the first UE capability, that is, reporting antenna switching capabilities: 't1r1-t1r2-t2r2-t1r4-t2r4-t2r8-t4r8'.

Another possible solution is that the RRC signaling carries part of the antenna switching capabilities indicated by the first UE capability, such as reporting antenna switching capabilities: 't1r2-t2r2-t1r4-t2r4-t2r8-t4r8'. In this manner, the opposite end device may determine other antenna switching capabilities indicated by the first UE capability according to a predetermined rule. For example, in this embodiment, the opposite end may determine t1r1.

Mode 3

The first UE capability indicates all or part of the following antenna switching capabilities (including at least t4r8):

1T1R, 1T2R, 1T4R, 2T2R, 2T4R, 2T6R, 2T8R, 4T4R, 4T8R (t1r1, t1r2, t1r4, t2r2, t2r4, t2r6, t2r8, t4r4, t4r8).

Mode 4

The first UE capability indicates all or part of the following antenna switching capabilities (including at least t4r8):

1T1R, 1T2R, 1T3R, 1T4R, 2T2R, 2T4R, 2T6R, 2T8R, 4T4R, 4T8R (t1r1, t1r2, t1r3, t1r4, t2r2, t2r4, t2r6, t2r8, t4r4, t4r8).

Embodiment 6

Figure 8:
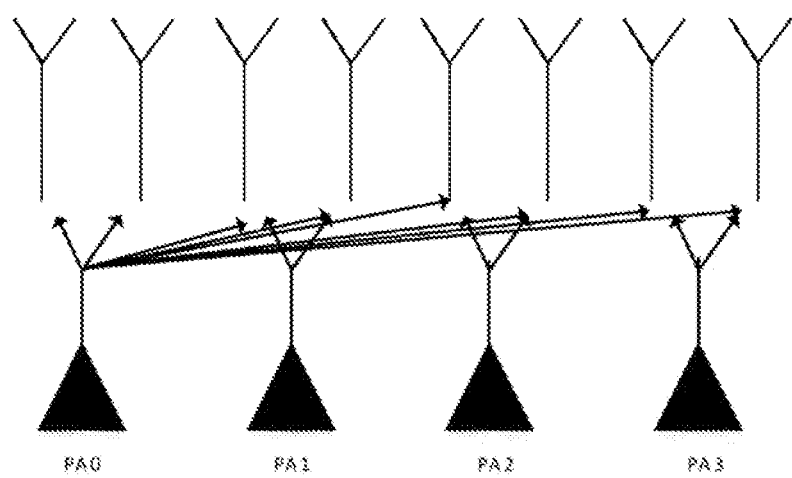
FIG. 8 is a schematic diagram of a hardware implementation of a terminal device applied according to Embodiment 6 of the present application.

FIG. 8 is a schematic diagram of a hardware implementation of a terminal device applied according to an embodiment of the present application. It can be seen from FIG. 8 that the terminal device adopts 4 transmitting antennas and 8 receiving antennas, and the supported maximum capability is 4T8R. The terminal device also supports other "fallback capabilities", such as 1T4R, 1T2R and so on. The terminal device sends a first UE capability to a network device or other terminal devices, where the first UE capability includes at least one antenna switching capability supported by the terminal device.

As shown in FIG. 8, the maximum capability supported by the terminal device applied in this embodiment is: xTyR=4T8R (txry=t4r8, x=4, y=8). The first UE capability may take the following forms.

Mode 1

The first UE capability indicates the following antenna switching capabilities:

1T1R, 1T2R, 1T4R, 2T2R, 2T4R, 4T4R, 1T8R, 4T8R (t1r1, t1r2, t1r4, t2r2, t2r4, t4r4, t1r8, t4r8).

For this mode, one RRC signaling (such as the above first RRC signaling) may be used for reporting.

A possible solution is that the RRC signaling carries all of the antenna switching capabilities indicated by the first UE capability, that is, reporting antenna switching capabilities: 't1r1-t1r2-t1r4-t2r2-t2r4-t4r4-t1r8-t4r8'.

Another possible solution is that the RRC signaling carries part of the antenna switching capabilities indicated by the first UE capability, such as reporting antenna switching capabilities: 't1r2-t1r4-t2r2-t2r4-t4r4-t1r8-t4r8'. In this manner, an opposite end device ma determine other antenna switching capabilities indicated by the first UE capability according to a predetermined rule. For example, in this embodiment, the opposite end may determine t1r1.

Mode 2

The first UE capability indicates part of the following antenna switching capabilities (including at least t4r8):

1T1R, 1T2R, 1T4R, 2T2R, 2T4R, 4T4R, 1T8R, 4T8R (t1r1, t1r2, t1r4, t2r2, t2r4, t4r4, t1r8, t4r8).

Mode 3

The first UE capability indicates all or part of the following antenna switching capabilities (including at least t4r8):

1T1R, 1T2R, 1T4R, 1T6R, 1T8R, 2T2R, 2T4R, 4T4R, 4T8R (t1r1, t1r2, t1r4, t1r6, t1r8, t2r2, t2r4, t4r4, t4r8).

Mode 4

The first UE capability indicates all or part of the following antenna switching capabilities (including at least t4r8):

1T1R, 1T2R, 1T3R, 1T4R, 1T5R, 1T6R, 1T7R, 1T8R, 2T2R, 2T4R, 4T4R, 4T8R (t1r1, t1r2, t1r3, t1r4, t1r5, t1r6, t1r7, t1r8, t2r2, t2r4, t4r4, t4r8).

Embodiment 7

Figure 9:
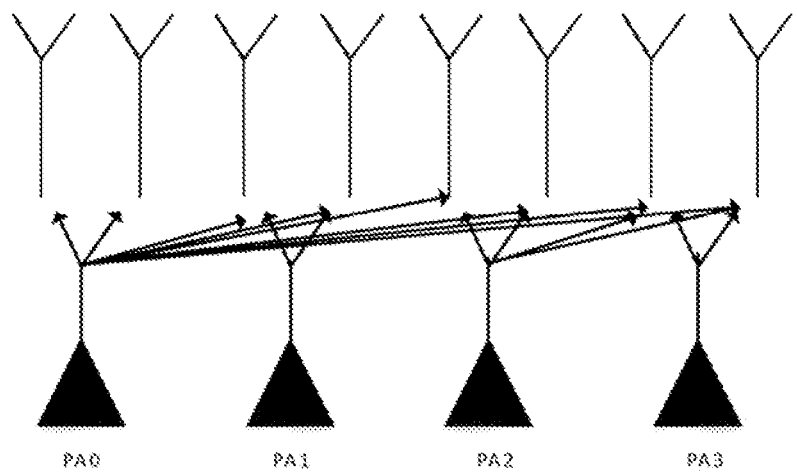
FIG. 9 is a schematic diagram of a hardware implementation of a terminal device applied according to Embodiment 7 of the present application.

FIG. 9 is a schematic diagram of a hardware implementation of a terminal device applied according to an embodiment of the present application. It can be seen from FIG. 9 that the terminal device adopts 4 transmitting antennas and 8 receiving antennas, and the supported maximum capability is 4T8R. The terminal device also supports other "fallback capabilities", such as 1T4R, 1T2R and so on. The terminal device sends a first UE capability to a network device or other terminal devices, where the first UE capability includes at least one antenna switching capability supported by the terminal device.

The antenna switching capability or configuration may also be represented by txry. In this embodiment and subsequent embodiments, the antenna switching capability or configuration will be represented by two ways of xTyR and txry.

As shown in FIG. 9, the maximum capability supported by the terminal device applied in this embodiment is: xTyR=4T8R (txry=t4r8, x=4, y=8). The first UE capability may take the following forms.

Mode 1

The first UE capability indicates the following antenna switching capabilities:

1T1R, 1T2R, 1T4R, 1T8R, 2T2R, 2T4R, 2T8R, 4T4R, 4T8R (t1r1, t1r2, t1r4, t2r2, t2r4, t4r4, t1r8, t2r8, t4r8).

For this mode, one RRC signaling (such as the above first RRC signaling) may be used for reporting.

A possible solution is that the RRC signaling carries all of the antenna switching capabilities indicated by the first UE capability, that is, reporting antenna switching capabilities: 't1r1-t1r2-t1r4-t2r2-t2r4-t4r4-t1r8-t2r8-t4r8'.

Another possible solution is that the RRC signaling carries part of the antenna switching capabilities indicated by the first UE capability, such as reporting antenna switching capabilities: 't1r2-t1r4-t2r2-t2r4-t4r4-t1r8-t2r8-t4r8'. In this manner, an opposite end device may determine other antenna switching capabilities indicated by the first UE capability according to a predetermined rule. For example, in this embodiment, the opposite end may determine t1r1.

Mode 2

The first UE capability indicates part of the following antenna switching capabilities (including at least t4r8):

1T1R, 1T2R, 1T4R, 1T8R, 2T2R, 2T4R, 2T8R, 4T4R, 4T8R (t1r1, t1r2, t1r4, t2r2, t2r4, t4r4, t1r8, t2r8, t4r8).

Mode 3

The first UE capability indicates all or part of the following antenna switching capabilities (including at least t4r8):

1T1R, 1T2R, 1T4R, 1T6R, 1T8R, 2T2R, 2T4R, 2T6R, 2T8R, 4T4R, 4T8R (t1r1, t1r2, t1r4, t1r6, t1r8, t2r2, t2r4, t2r6, t2r8, t4r4, t4r8).

Mode 4

The first UE capability indicates all or part of the following antenna switching capabilities (including at least t4r8):

1T1R, 1T2R, 1T3R, 1T4R, 1T5R, 1T6R, 1T6R, 1T7R, 1T8R, 2T2R, 2T4R, 2T6R, 2T8R, 4T4R, 4T8R.

Embodiment 8

Figure 10:
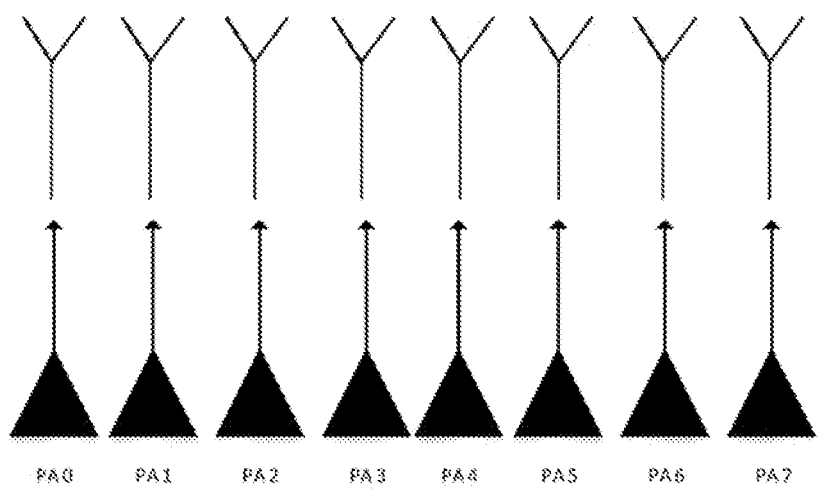
FIG. 10 is a schematic diagram of a hardware implementation of a terminal device applied according to Embodiment 8 of the present application.

FIG. 10 is a schematic diagram of a hardware implementation of a terminal device applied according to an embodiment of the present application. It can be seen from FIG. 10 that the terminal device adopts 8 transmitting antennas and 8 receiving antennas, and the supported maximum capability is 8T8R. The terminal device also supports other "fallback capabilities", such as 1T1R, 2T2R and so on. The terminal device sends a first UE capability to a network device or other terminal devices, where the first UE capability includes at least one antenna switching capability supported by the terminal device.

As shown in FIG. 10, the maximum capability supported by the terminal device applied in this embodiment is: xTyR=8T8R (txry=t8r8, x=8, y=8). The first UE capability may take the following forms.

Mode 1

The first UE capability indicates the following antenna switching capabilities:

1T1R, 2T2R, 4T4R, 8T8R (t1r1, t2r2, t4r4, t8r8).

For this mode, one RRC signaling (such as the above first RRC signaling) may be used for reporting.

A possible solution is that the RRC signaling carries all of the antenna switching capabilities indicated by the first UE capability, that is, reporting antenna switching capabilities: 't1r1-t2r2-t4r4-t8r8'.

Another possible solution is that the RRC signaling carries part of the antenna switching capabilities indicated by the first UE capability, such as reporting antenna switching capabilities: 't2r2-t4r4-t8r8'. In this manner, an opposite end device may determine other antenna switching capabilities indicated by the first UE capability according to a predetermined rule. For example, in this embodiment, the opposite end may determine t1r1.

Mode 2

The first UE capability indicates part of the following antenna switching capabilities (including at least t8r8):

1T1R, 2T2R, 4T4R, 6T6R, 8T8R (t1r1, t2r2, t4r4, t6r6, t8r8).

The first UE capability indicates all or part of the following antenna switching capabilities (including at least t8r8):

1T1R, 2T2R, 3T3R, 4T4R, 5T5R, 6T6R, 7T7R, 8T8R (t1r1, t2r2, t3r3, t4r4, t5r5, t6r6, t7r7, t8r8).

Embodiment 9

Figure 11:
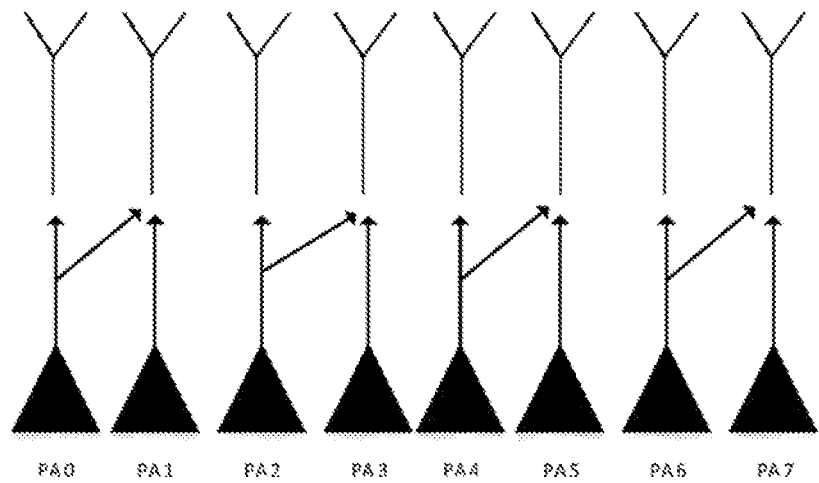
FIG. 11 is a schematic diagram of a hardware implementation of a terminal device applied according to Embodiment 9 of the present application.

FIG. 11 is a schematic diagram of a hardware implementation of a terminal device applied according to an embodiment of the present application. It can be seen from FIG. 11 that the terminal device adopts 8 transmitting antennas and 8 receiving antennas, and the supported maximum capability is 8T8R. The terminal device also supports other "fallback capabilities", such as 2T4R, 1T2R and so on. The terminal device sends a first UE capability to a network device or other terminal devices, where the first UE capability includes at least one antenna switching capability supported by the terminal device.

As shown in FIG. 11, the maximum capability supported by the terminal device applied in this embodiment is: xTyR=8T8R (txry=t8r8, x=8, y=8). The first UE capability may take the following forms.

Mode 1

The first UE capability indicates the following antenna switching capabilities:

1T1R, 1T2R, 2T2R, 2T4R, 4T4R, 4T8R, 8T8R (t1r1, t1r2, t2r2, t2r4, t4r4, t4r8, t8r8).

For this mode, one RRC signaling (such as the above first RRC signaling) may be used for reporting.

A possible solution is that the RRC signaling carries all of the antenna switching capabilities indicated by the first UE capability, that is, reporting antenna switching capabilities: 't1r1-t1r2-t2r2-t2r4-t4r4-t4r8-t8r8'.

Another possible solution is that the RRC signaling carries part of the antenna switching capabilities indicated by the first UE capability, such as reporting antenna switching capabilities: 't1r2-t2r2-t2r4-t4r4-t4r8-t8r8'. In this manner, an opposite end device may determine other antenna switching capabilities indicated by the first UE capability according to a predetermined rule. For example, in this embodiment, the opposite end may determine t1r1.

Mode 2

The first UE capability indicates part of the following antenna switching capabilities (including at least t8r8):

1T1R, 1T2R, 2T2R, 2T4R, 4T4R, 4T8R, 8T8R (t1r1, t1r2, t2r2, t2r4, t4r4, t4r8, t8r8).

Mode 3

The first UE capability indicates all or part of the following antenna switching capabilities (including at least t8r8):

1T1R, 1T2R, 2T2R, 2T4R, 3T6R, 4T4R, 4T8R, 6T6R, 8T8R (t1r1, t1r2, t2r2, t2r4, t3r6, t4r4, t4r8, t6r6, t8r8).

Mode 4

The first UE capability indicates all or part of the following antenna switching capabilities (including at least t8r8):

1T1R, 1T2R, 2T2R, 2T4R, 3T3R, 3T6R, 4T4R, 4T8R, 5T5R, 6T6R, 7T7R, 8T8R (t1r1, t1r2, t2r2, t2r4, t3r3, t3r6, t4r4, t4r8, t5r5, t6r6, t7r7, t8r8).

Embodiment 10

Figure 12:
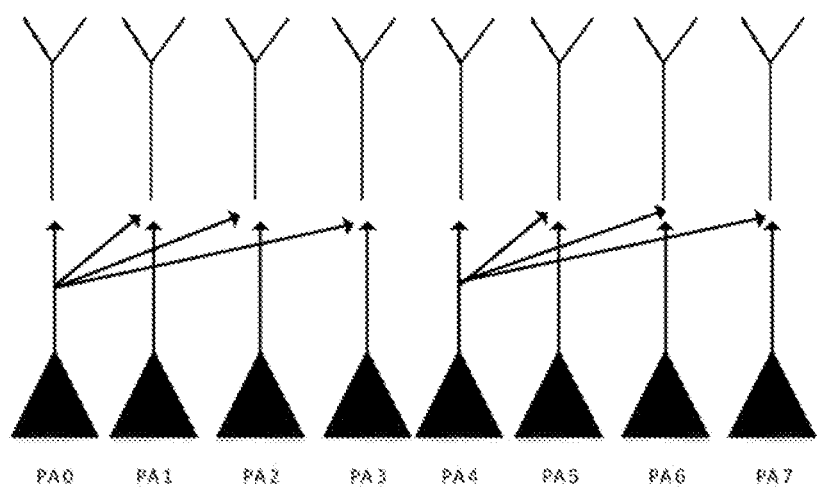
FIG. 12 is a schematic diagram of a hardware implementation of a terminal device applied according to Embodiment 10 of the present application.

FIG. 12 is a schematic diagram of a hardware implementation of a terminal device applied according to an embodiment of the present application. It can be seen from FIG. 12 that the terminal device adopts 8 transmitting antennas and 8 receiving antennas, and the supported maximum capability is 8T8R. The terminal device also supports other "fallback capabilities", such as 1T4R, 1T2R and so on. The terminal device sends a first UE capability to a network device or other terminal devices, where the first UE capability includes at least one antenna switching capability supported by the terminal device.

The antenna switching capability or configuration may also be represented by txry. In this embodiment and subsequent embodiments, the antenna switching capability or configuration will be represented by two ways of xTyR and txry.

As shown in FIG. 12, the maximum capability supported by the terminal device applied in this embodiment is: xTyR=8T8R (txry=t8r8, x=8, y=8). The first UE capability may take the following forms.

Mode 1

The first UE capability indicates the following antenna switching capabilities:

1T1R, 1T2R, 1T4R, 2T2R, 2T4R, 2T8R, 4T4R, 8T8R (t1r1, t1r2, 1lr4, t2r2, t2r4, t2r8, t4r4, t8r8).

For this mode, one RRC signaling (such as the above first RRC signaling) may be used for reporting.

A possible solution is that the RRC signaling carries all of the antenna switching capabilities indicated by the first UE capability, that is, reporting antenna switching capabilities: 't1r1-t1r2-t1r4-t2r2-t2r4-t2r8-t4r4-t8r8'.

Another possible solution is that the RRC signaling carries part of the antenna switching capabilities indicated by the first UE capability, such as reporting antenna switching capabilities: 't1r2-t1r4-t2r2-t2r4-t2r8-t4r4-t8r8'. In this manner, an opposite end device may determine other antenna switching capabilities indicated by the first UE capability according to a predetermined rule. For example, in this embodiment, the opposite end may determine t1r1.

Mode 2

The first UE capability indicates part of the following antenna switching capabilities (including at least t8r8):

1T1R, 1T2R, 1T4R, 2T2R, 2T4R, 2T8R, 4T4R, 8T8R (t1r1, t1r2, t1r4, t2r2, t2r4, t2r8, t4r4, t8r8).

Mode 3

The first UE capability indicates all or part of the following antenna switching capabilities (including at least t8r8):

1T1R, 1T2R, 1T4R, 2T2R, 2T4R, 2T6R, 2T8R, 4T4R, 6T6R, 8T8R (t1r1, t1r2, t1r4, t2r2, t2r4, t2r6, t2r8, t4r4, t6r6, t8r8).

Mode 4

The first UE capability indicates all or part of the following antenna switching capabilities (including at least t8r8):

1T1R, 1T2R, 1T3R, 1T4R, 2T2R, 2T4R, 2T6R, 2T8R, 3T3R, 4T4R, 5T5R, 6T6R, 7T7R, 8T8R (t1r1, t1r2, t1r3, t1r4, t2r2, t2r4, t2r6, t2r8, t3r3, t4r4, t5r5, t6r6, t7r7, t8r8).

Embodiment 11

Figure 13:
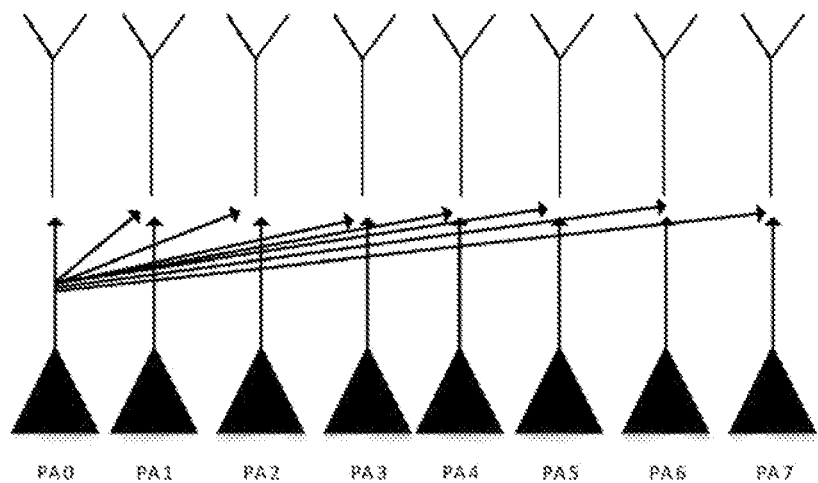
FIG. 13 is a schematic diagram of a hardware implementation of a terminal device applied according to Embodiment 11 of the present application.

FIG. 13 is a schematic diagram of a hardware implementation of a terminal device applied according to an embodiment of the present application. It can be seen from FIG. 13 that the terminal device adopts 8 transmitting antennas and 8 receiving antennas, and the supported maximum capability is 8T8R. The terminal device also supports other "fallback capabilities", such as 1T4R, 1T2R and so on. The terminal device sends a first UE capability to a network device or other terminal devices, where the first UE capability includes at least one antenna switching capability supported by the terminal device.

As shown in FIG. 13, the maximum capability supported by the terminal device applied in this embodiment is: xTyR=8T8R (txry=t8r8, x=8, y=8). The first UE capability may take the following forms.

Mode 1

The first UE capability indicates the following antenna switching capabilities:

1T1R, 1T2R, 1T4R, 1T8R, 2T2R, 4T4R, 8T8R (t1r1, t1r2, t1r4, t1r8, t2r2, t4r4, t8r8).

For this mode, one RRC signaling (such as the above first RRC signaling) may be used for reporting.

A possible solution is that the RRC signaling carries all of the antenna switching capabilities indicated by the first UE capability, that is, reporting antenna switching capabilities: 't1r1-t1r2-t1r4-t1r8-t2r2-t4r4-t8r8'.

Another possible solution is that the RRC signaling carries part of the antenna switching capabilities indicated by the first UE capability, such as reporting antenna switching capabilities: 't1r2-t1r4-t1r8-t2r2-t4r4-t8r8'. In this manner, an opposite end device may determine other antenna switching capabilities indicated by the first UE capability according to a predetermined rule. For example, in this embodiment, the opposite end may determine t1r1.

Mode 2

The first UE capability indicates part of the following antenna switching capabilities (including at least t8r8);

1T1R, 1T2R, 1T4R, 1T8R, 2T2R, 4T4R, 8T8R (t1r1, t1r2, t1r4, t1r8, t2r2, t4r4, t8r8).

Mode 3

The first UE capability indicates all or part of the following antenna switching capabilities (including at least t8r8):

1T1R, 1T2R, 1T4R, 1T6R, 1T8R, 2T2R, 4T4R, 6T6R, 8T8R (t1r1, t1r2, t1r4, t1r6, t1r8, t2r2, t4r4, t6r6, t8r8).

Mode 4

The first UE capability indicates all or part of the following antenna switching capabilities (including at least t8r8):

1T1R, 1T2R, 1T3R, 1T4R, 1T5R, 1T6R, 1T7R, 1T8R, 2T2R, 3T3R, 4T4R, 5T5R, 6T6R, 7T7R, 8T8R (t1r1, t1r2, t1r3, t1r4, t1r5, t1r6, t1r7, t1r8, t2r2, t3r3, t4r4, t5r5, t6r6, t7r7, t8r8).

Embodiment 12

Figure 14:
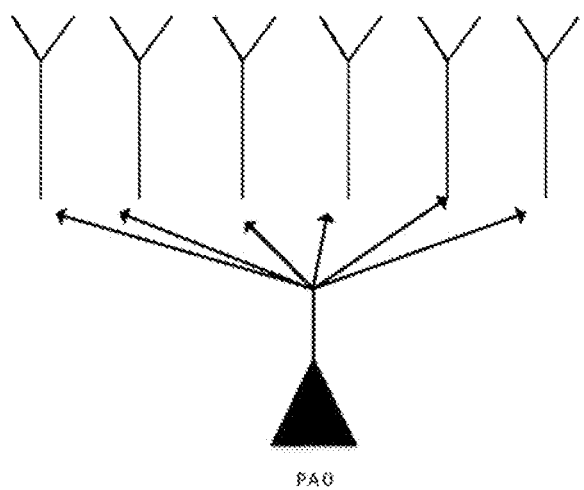
FIG. 14 is a schematic diagram of a hardware implementation of a terminal device applied according to Embodiment 12 of the present application.

FIG. 14 is a schematic diagram of a hardware implementation of a terminal device applied according to an embodiment of the present application. It can be seen from FIG. 14 that the terminal device adopts 1 transmitting antenna and 6 receiving antennas, and the supported maximum capability is 1T6R. The terminal device also supports other "fallback capabilities", such as 1T4R, 1T2R and so on. The terminal device sends a first UE capability to a network device or other terminal devices, where the first UE capability includes at least one antenna switching capability supported by the terminal device.

As shown in FIG. 14, the maximum capability supported by the terminal device applied in this embodiment is: xTyR=1T6R (txry=t1r6, x=1, y=6). The first UE capability may take the following forms.

Mode 1

The first UE capability indicates the following antenna switching capabilities:

1T1R, 1T2R, 1T4R, 1T6R (t1r1, t1r2, t1r4, t1r6).

For this mode, one RRC signaling (such as the above first RRC signaling) may be used for reporting.

A possible solution is that the RRC signaling carries all of the antenna switching capabilities indicated by the first UE capability, that is, reporting antenna switching capabilities: 't1r1-t1r2-t1r4-t1r6'.

Another possible solution is that the RRC signaling carries part of the antenna switching capabilities indicated by the first UE capability, such as reporting antenna switching capabilities: 't1r2-t1r4-t1r6'. In this manner, an opposite end device may determine other antenna switching capabilities indicated by the first UE capability according to a predetermined rule. For example, in this embodiment, the opposite end may determine t1r1.

Mode 2

The first UE capability indicates part of the following antenna switching capabilities (including at least t1r6):

1T1R, 1T2R, 1T4R, 1T6R (t1r1, t1r2, t1r4, t1r6).

For example, the first UE capability indicates the following antenna switching capabilities:

1T1R, 1T2R, 1T6R (t1r1, t1r2, t1r6).

If one RRC signaling is used for reporting, a possible solution is that the RRC signaling carries all of the antenna switching capabilities indicated by the first UE capability, that is, reporting antenna switching capabilities: 't1r1-t1r2-t1r6'.

Another possible solution is that the RRC signaling carries part of the antenna switching capabilities indicated by the first UE capability, such as reporting antenna switching capabilities: 't1r2-t1r6'. In this manner, an opposite end device may determine other antenna switching capabilities indicated by the first UE capability according to a predetermined rule. For example, in this embodiment, the opposite end may determine t1r1.

Mode 3

The first UE capability indicates all or part of the following antenna switching capabilities (including at least t1r6):

1T1R, 1T2R, 1T3R, 1T4R, 1T5R, 1T6R (t1r1, t1r2, t1r3, t1r4, t1r5, t1r6).

Embodiment 13

Figure 15:
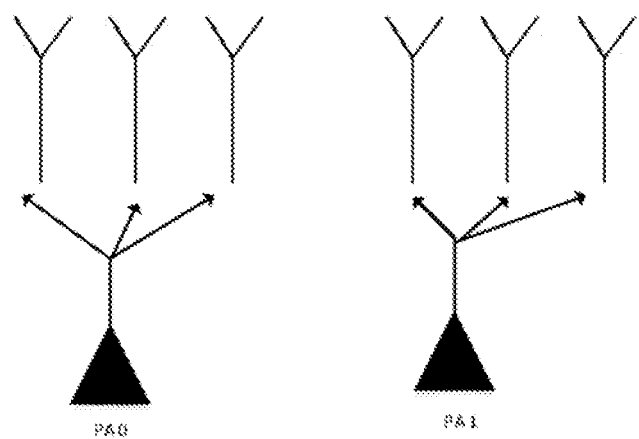
FIG. 15 is a schematic diagram of a hardware implementation of a terminal device applied according to Embodiment 13 of the present application.

FIG. 15 is a schematic diagram of a hardware implementation of a terminal device applied according to an embodiment of the present application. It can be seen from FIG. 15 that the terminal device adopts 2 transmitting antennas and 6 receiving antennas, and the supported maximum capability is 2T6R. The terminal device also supports other "fallback capabilities", such as 2T4R, 1T2R and so on. The terminal device sends a first UE capability to a network device or other terminal devices, where the first UE capability includes at least one antenna switching capability supported by the terminal device.

As shown in FIG. 15, the maximum capability supported by the terminal device applied in this embodiment is: xTyR=2T6R (txry=t2r6, x=2, y=6). The first UE capability may take the following forms.

Mode 1

The first UE capability indicates the following antenna switching capabilities:

1T1R, 1T2R, 2T2R, 2T4R, 2T6R (t1r1, t1r2, t2r2, t2r4, t2r6).

For this mode, one RRC signaling (such as the above first RRC signaling) may be used for reporting.

A possible solution is that the RRC signaling carries all of the antenna switching capabilities indicated by the first UE capability, that is, reporting antenna switching capabilities: 't1r1-t1r2-t2r2-t2r4-t2r6'.

Another possible solution is that the RRC signaling carries part of the antenna switching capabilities indicated by the first UE capability, such as reporting antenna switching capabilities: 't1r2-t2r2-t2r4-t2r6'. In this manner, an opposite end device may determine other antenna switching capabilities indicated by the first UE capability according to a predetermined rule. For example, in this embodiment, the opposite end may determine t1r1.

Mode 2

The first UE capability indicates part of the following antenna switching capabilities (including at least t2r6):

1T1R, 1T2R, 2T2R, 2T4R, 2T6R (t1r1, t1r2, t2r2, t2r4, t2r6).

Mode 3

The first UE capability indicates all or part of the following antenna switching capabilities (including at least t2r6):

1T1R, 1T2R, 1T3R, 2T2R, 2T4R, 2T6R (t1r1, t1r2, t1r3, t2r2, t2r4, t2r6).

Embodiment 14

Figure 16:
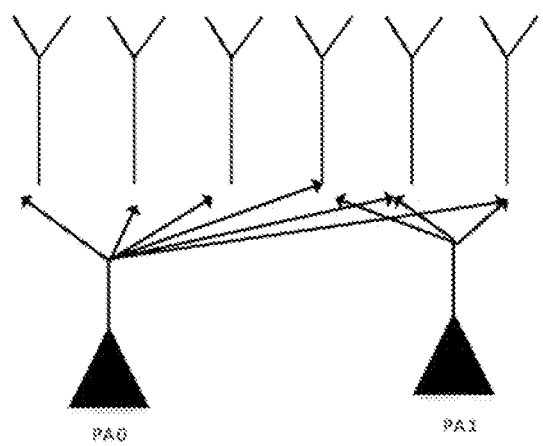
FIG. 16 is a schematic diagram of a hardware implementation of a terminal device applied according to Embodiment 14 of the present application.

FIG. 16 is a schematic diagram of a hardware implementation of a terminal device of another application according to an embodiment of the present application. It can be seen from FIG. 16 that the terminal device adopts 2 transmitting antennas and 6 receiving antennas, and the supported maximum capability is 2T6R. The terminal device also supports other "fallback capabilities", such as 1T4R, 1T2R and so on. The terminal device sends a first UE capability to a network device or other terminal devices, where the first UE capability includes at least one antenna switching capability supported by the terminal device.

As shown in FIG. 16, the maximum capability supported by the terminal device applied in this embodiment is: xTyR=2T6R (txry=t2r6, x=2, y=6). The first UE capability may take the following forms.

Mode 1

The first UE capability indicates the following antenna switching capabilities:

1T1R, 1T2R, 1T4R, 1T6R, 2T2R, 2T4R, 2T6R (t1r1, t1r2, t1r4, t1r6, t2r2, t2r4, t2r6).

For this mode, one RRC signaling (such as the above first RRC signaling) may be used for reporting.

A possible solution is that the RRC signaling carries all of the antenna switching capabilities indicated by the first UE capability, that is, reporting antenna switching capabilities: 't1r1-t1r2-t1r4-t1r6-t2r2-t2r4-t2r6'.

Another possible solution is that the RRC signaling carries part of the antenna switching capabilities indicated by the first UE capability, such as reporting antenna switching capabilities: 't1r2-t1r4-t1r6-t2r2-t2r4-t2r6'. In this manner, an opposite end device may determine other antenna switching capabilities indicated by the first UE capability according to a predetermined rule. For example, in this embodiment, the opposite end may determine t1r1.

Mode 2

The first UE capability indicates part of the following antenna switching capabilities (including at least t2r6):

1T1R, 1T2R, 1T4R, 1T6R, 2T2R, 2T4R, 2T6R (t1r1, t1r2, t1r4, t1r6, t2r2, t2r4, t2r6).

For example, the first UE capability indicates the following antenna switching capabilities:

1T1R, 1T2R, 1T4R, 1T6R, 2T6R (t1r1, t1r2, t1r4, t1r6, t2r6).

If one RRC signaling is used for reporting, a possible solution is that the RRC signaling carries all of the antenna switching capabilities indicated by the first UE capability, that is, reporting antenna switching capabilities: 't1r1-t1r2-t1r4-t1r6-t2r6'.

Another possible solution is that the RRC signaling carries part of the antenna switching capabilities indicated by the first UE capability, such as reporting antenna switching capabilities: 't1r2-t1r4-t1r6-t2r6'. In this manner, the opposite end device may determine other antenna switching capabilities indicated by the first UE capability according to a predetermined rule. For example, in this embodiment, the opposite end may determine t1r1.

Mode 3

The first UE capability indicates all or part of the following antenna switching capabilities (including at least t2r6):

1T1R, 1T2R, 1T3R, 1T4R, 1T5R, 1T6R, 2T2R, 2T4R, 2T6R (t1r1, t1r2, t1r3, t1r4, t1r5, t1r6, t2r2, t2r4, t2r6).

Embodiment 15

Figure 17:
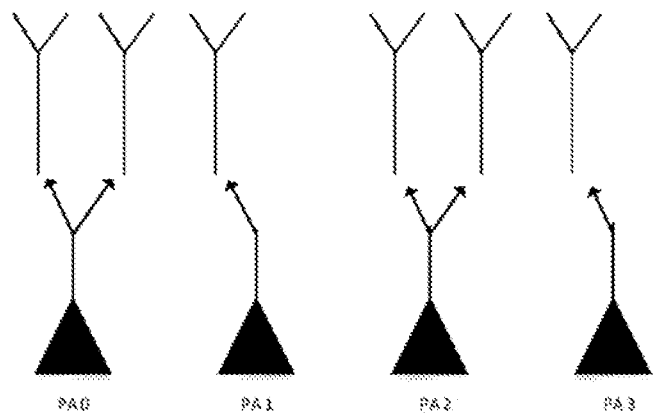
FIG. 17 a schematic diagram of a hardware implementation of a terminal device applied according to Embodiment 15 of the present application.

FIG. 17 is a schematic diagram of a hardware implementation of a terminal device applied according to an embodiment of the present application. It can be seen from FIG. 17 that the terminal device adopts 4 transmitting antennas and 6 receiving antennas, and the supported maximum capability is 4T6R. The terminal device also supports other "fallback capabilities", such as 1T2R, 2T2R and so on. The terminal device sends a first UE capability to a network device or other terminal devices, where the first UE capability includes at least one antenna switching capability supported by the terminal device.

As shown in FIG. 17, the maximum capability supported by the terminal device applied in this embodiment is: xTyR=4T6R, (txry=t4r6, x=4, y=6). The first UE capability may take the following forms.

Mode 1

The first UE capability indicates the following antenna switching capabilities:

1T1R, 1T2R, 2T2R, 2T4R, 4T4R, 4T6R (t1r1, t1r2, t2r2, t2r4, t4r4, t4r6).

For this mode, one RRC signaling (such as the above first RRC signaling) may be used for reporting.

A possible scheme is that the RRC signaling carries all of the antenna switching capabilities indicated by the first UE capability, that is, reporting antenna switching capabilities: 't1r1-t1r2-t2r2-t2r4-t4r4-t4r6'.

Another possible solution is that the RRC signaling carries part of the antenna switching capabilities indicated by the first UE capability, such as reporting antenna switching capabilities: 't1r2-t2r2-t2r4-t4r4-t4r6'. In this manner, an opposite end device may determine other antenna switching capabilities indicated by the first UE capability according to a predetermined rule. For example, in this embodiment, the opposite end may determine t1r1.

Mode 2

The first UE capability indicates part of the following antenna switching capabilities (including at least t4r6):

1T1R, 1T2R, 2T2R, 2T4R, 4T4R, 4T6R (t1r1, t1r2, t2r2, t2r4, t4r4, t4r6).

For example, the first UE capability indicates the following antenna switching capabilities:

1T1R, 1T2R, 2T2R, 2T4R, 4T6R (t1r1, t1r2, t2r2, t2r4, t4r6).

If one RRC signaling is used for reporting, a possible solution is that the RRC signaling carries all of the antenna switching capabilities indicated by the first UE capability, that is, reporting antenna switching capabilities: 't1r1-t1r2-t2r2-t2r4-t4r6'.

Another possible solution is that the RRC signaling carries part of the antenna switching capabilities indicated by the first UE capability, such as reporting antenna switching capabilities: 't1r2-t2r2-t2r4-t4r6'. In this manner, the opposite end device may determine other antenna switching capabilities indicated by the first UE capability according to a predetermined rule. For example, in this embodiment, the opposite end may determine t1r1.

Embodiment 16

Figure 18:
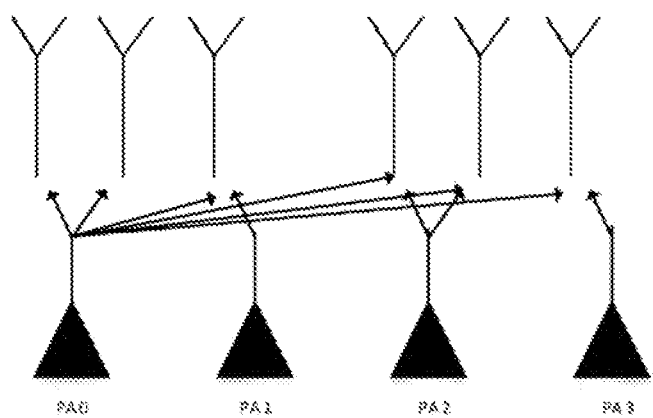
FIG. 18 is a schematic diagram of a hardware implementation of a terminal device applied according to Embodiment 16 of the present application.

FIG. 18 is a schematic diagram of a hardware implementation of a terminal device of another application according to an embodiment of the present application. It can be seen from FIG. 18 that the terminal device adopts 4 transmitting antennas and 6 receiving antennas, and the supported maximum capability is 4T6R. The terminal device also supports other "fallback capabilities", such as 1T4R, 1T2R and so on. The terminal device sends a first UE capability to a network device or other terminal devices, where the first UE capability includes at least one antenna switching capability supported by the terminal device.

As shown in FIG. 18, the maximum capability supported by the terminal device applied in this embodiment is: xTyR=4T6R (txry=t4r6, x=4, y=6). The first UE capability may take the following forms.

Mode 1

The first UE capability indicates the following antenna switching capabilities:

1T1R, 1T2R, 1T4R, 1T6R, 2T2R, 2T4R, 4T4R, 4T6R (t1r1, t1r2, t1r4, t1r6, t2r2, t2r4, t4r4, t4r6).

For this mode, one RRC signaling (such as the above first RRC signaling) may be used for reporting.

A possible solution is that the RRC signaling carries all of the antenna switching capabilities indicated by the first UE capability, that is, reporting antenna switching capabilities: 't1r1-t1r2-t1r4-t1r6-t2r2-t2r4-t4r4-t4r6'.

Another possible solution is that the RRC signaling carries part of the antenna switching capabilities indicated by the first UE capability, such as reporting antenna switching capabilities: 't1r2-t1r4-t1r6-t2r2-t2r4-t4r4-t4r6'. In this manner, an opposite end device may determine other antenna switching capabilities indicated by the first UE capability according to a predetermined rule. For example, in this embodiment, the opposite end may determine t1r1.

Mode 2

The first UE capability indicates part of the following antenna switching capabilities (including at least t4r6):

1T1R, 1T2R, 1T4R, 1T6R, 2T2R, 2T4R, 4T4R, 4T6R (t1r1, t1r2, t1r4, t1r6, t2r2, t2r4, t4r4, t4r6).

For example, the first UE capability indicates the following antenna switching capabilities:

1T1R, 1T2R, 1T4R, 1T6R, 2T4R, 4T6R (t1r1, t1r2, t1r4, t1r6, t2r4, t4r6).

If one RRC signaling is used for reporting, a possible solution is that the RRC signaling carries all of the antenna switching capabilities indicated by the first UE capability, that is, reporting antenna switching capabilities: 't1r1-t1r2-t1r4-t1r6-t2r4-t4r6'.

Another possible solution is that the RRC signaling carries part of the antenna switching capabilities indicated by the first UE capability, such as reporting antenna switching capabilities: 't1r2-t1r4-t1r6-t2r4-t4r6'. In this manner, the opposite end device may determine other antenna switching capabilities indicated by the first UE capability according to a predetermined rule. For example, in this embodiment, the opposite end may determine t1r1.

Mode 3

The first UE capability indicates all or part of the following antenna switching capabilities (including at least t4r6):

1T1R, 1T2R, 1T3R, 1T4R, 1T5R, 1T6R, 2T2R, 2T4R, 4T4R, 4T6R (t1r1, t1r2, t1r3, t1r4, 1t5r, 1t6r, t2r2, t2r4, t4r4, t4r6)

Embodiment 17

Figure 19:
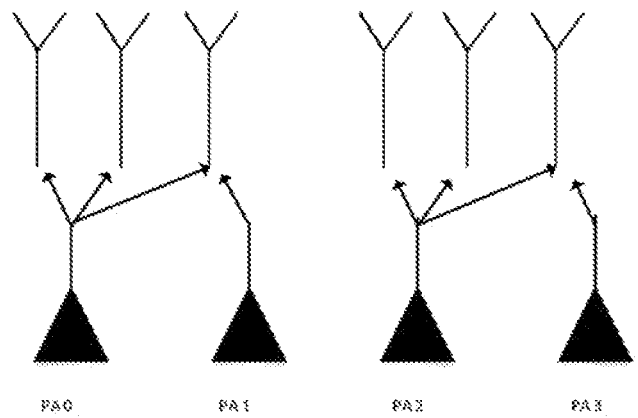
FIG. 19 is a schematic diagram of a hardware implementation of a terminal device applied according to Embodiment 17 of the present application.

FIG. 19 is a schematic diagram of a hardware implementation of a terminal device applied according to an embodiment of the present application. It can be seen from FIG. 19 that the terminal device adopts 4 transmitting antennas and 6 receiving antennas, and the supported maximum capability is 4T6R. The terminal device also supports some other "fallback capabilities", such as 1T1R, 1T2R and so on. The terminal device sends a first UE capability to a network device or other terminal devices, where the first UE capability includes at least one antenna switching capability supported by the terminal device.

As shown in FIG. 19, the maximum capability supported by the terminal device applied in this embodiment is: xTyR=4T6R (txry=t4r6, x=4, y=6). The first UE capability may take the following forms.

Mode 1

The first UE capability indicates the following antenna switching capabilities:

1T1R, 1T2R, 2T2R, 2T4R, 2T6R, 4T4R, 4T6R (t1r1, t1r2, t2r2, t2r4, t2r6, t4r4, t4r6).

For this mode, one RRC signaling (such as the above first RRC signaling) may be used for reporting.

A possible solution is that the RRC signaling carries all of the antenna switching capabilities indicated by the first UE capability, that is, reporting antenna switching capabilities: 't1r1-t1r2-t2r2-t2r4-t2r6-t4r4-t4r6'.

Another possible solution is that the RRC signaling carries part of the antenna switching capabilities indicated by the first UE capability, such as reporting antenna switching capabilities: 't1r2-t2r2-t2r4-t2r6-t4r4-t4r6'. In this manner, an opposite end device may determine other antenna switching capabilities indicated by the first UE capability according to a predetermined rule. For example, in this embodiment, the opposite end may determine t1r1.

Mode 2

The first UE capability indicates all or part of the following antenna switching capabilities (including at least t4r6):

1T1R, 1T2R, 2T2R, 2T4R, 2T6R, 4T4R, 4T6R (t1r1, t1r2, t2r2, t2r4, t2r6, t4r4, t4r6).

Mode 3

The first UE capability indicates all or part of the following antenna switching capabilities (including at least t4r6):

1T1R, 1T2R, 1T3R, 2T2R, 2T4R, 2T6R, 4T4R, 4T6R (t1r1, t1r2, t1r3, t2r2, t2r4, t2r6, t4r4, t4r6).

Embodiment 18

FIG. 20 is a schematic diagram of a hardware implementation of a terminal device applied according to an embodiment of the present application. It can be seen from FIG. 20 that the terminal device adopts 4 transmitting antennas and 6 receiving antennas, and the supported maximum capability is 4T6R. The terminal device also supports other "fallback capabilities", such as 1T4R, 1T2R and so on. The terminal device sends a first UE capability to a network device or other terminal devices, where the first UE capability includes at least one antenna switching capability supported by the terminal device.

As shown in FIG. 20, the maximum capability supported by the terminal device applied in this embodiment is: xTyR=4T6R (txry=t4r6, x=4, y=6). The first UE capability may take the following forms.

Mode 1

The first UE capability indicates the following antenna switching capabilities:

1T1R, 1T2R, 1T4R, 1T6R, 2T2R, 2T4R, 2T6R, 4T4R, 4T6R (t1r1, t1r2, t1r4, t2r2, t2r4, t4r4, t1r6, t2r6, t4r6).

For this mode, one RRC signaling (such as the above first RRC signaling) may be used for reporting.

A possible solution is that the RRC signaling carries all of the antenna switching capabilities indicated by the first UE capability, that is, reporting antenna switching capabilities: 't1r1-t1r2-t1r4-t2r2-t2r4-t4r4-t1r6-t2r6-t4r6'.

Another possible solution is that the RRC signaling carries part of the antenna switching capabilities indicated by the first UE capability, such as reporting antenna switching capabilities: 't1r2-t1r4-t2r2-t2r4-t4r4-t1r6-t2r6-t4r6'. In this manner, an opposite end device may determine other antenna switching capabilities indicated by the first UE capability according to a predetermined rule. For example, in this embodiment, the opposite end may determine t1r1.

Mode 2

The first UE capability indicates all or part of the following antenna switching capabilities (including at least t4r6):

1T1R, 1T2R, 1T4R, 1T6R, 2T2R, 2T4R, 2T6R, 4T4R, 4T6R (t1r1, t1r2, t1r4, t2r2, t2r4, t4r4, t1r6, t2r6, t4r6).

Mode 3

The first UE capability indicates all or part of the following antenna switching capabilities (including at least t4r6):

1T1R, 1T2R, 1T3R, 1T4R, 1T5R, 1T6R, 2T2R, 2T4R, 2T6R, 4T4R, 4T6R (t1r1, t1r2, t1r3, t1r4, t1r5, t1r6, t2r2, t2r4, t2r6, t4r4, t4r6).

An embodiment of the present application also proposes a method for indicating an antenna switching capability. FIG. 21 is a flowchart for implementing a method 2100 for indicating an antenna switching capability according to an embodiment of the present application, including:

S2110: a communication device receives a first UE capability, where the first UE capability indicates at least one antenna switching capability supported by a first terminal device; at least part of the at least one antenna switching capability supports that the first terminal device has more than 4 receiving antennas.

In an implementation, the antenna switching capability is represented by xTyR, where xTyR represents that an SRS supports transmission through x antenna ports, y corresponds to the number of all or part of receiving antennas of the first terminal device, y of at least part of xTyR is greater than 4, x and y are positive integers.

In an implementation, the communication device is a network device or a second terminal device.

In an implementation, that the communication device receives the first UE capability includes that:

the communication device receives the first UE capability through a first RRC signaling;

or, the communication device receives the first UE capability through a second RRC signaling and a third RRC signaling, where the second RRC signaling indicates a first subset of the at least one antenna switching capability, and the third RRC signaling indicates a second subset of the at least one antenna switching capability; the first subset and the second subset include different antenna switching capabilities, and a union of the first subset and the second subset includes the at least one antenna switching capability indicated by the first UE capability.

In an implementation, that the communication device receives the first UE capability through the first RRC signaling includes that:

the first RRC signaling carries xTyR corresponding to all of the antenna switching capability indicated by the first UE capability; or, the first RRC signaling carries xTyR corresponding to part of antenna switching capabilities indicated by the first UE capability.

In an implementation, in a case that the first RRC signaling carries xTyR corresponding; to part of the antenna switching capabilities indicated by the first UE capability, the communication device determines, according to a predetermined rule, other antenna switching capability in the first UE capability other than an antenna switching capability corresponding to xTyR carried by the first RRC signaling.

In an implementation, that the communication device receives the first UE capability through the second RRC signaling and the third RRC signaling includes that:

the second RRC signaling carries xTyR corresponding to all of an antenna switching capability in the first subset, and the third RRC signaling carries xTyR corresponding to all of an antenna switching capability in the second subset; or, the second RRC signaling carries xTyR corresponding to all of an antenna switching capability in the first subset, and the third RRC signaling carries xTyR corresponding to part of antenna switching capabilities in the second subset; or, the second RRC signaling carries xTyR corresponding to part of antenna switching capabilities in the first subset, and the third RRC signaling carries xTyR corresponding to all of an antenna switching capabilities in the second subset; or, the second RRC signaling carries xTyR corresponding to part of antenna switching capabilities in the first subset, and the third RRC signaling carries xTyR corresponding to part of antenna switching capabilities in the second subset.

In an implementation, in a case that the second RRC signaling carries xTyR corresponding to part of the antenna switching capabilities in the first subset, the communication device determines, according to a predetermined rule, other antenna switching capability in the first subset other than an antenna switching capability corresponding to xTyR carried by the second RRC signaling;

in a case that the third RRC signaling carries xTyR corresponding to part of the antenna switching capabilities in the first subset, the communication device determines, according to a predetermined rule, other antenna switching capability in the first subset other than an antenna switching capability corresponding to xTyR carried by the third RRC signaling.

In an implementation, the method for indicating an antenna switching capability further includes that:

the communication device sends a configuration message corresponding to the at least one antenna switching capability indicated by the first UE capability to the first terminal device;

where the configuration message indicates at least one SRS resource group set, each of the SRS resource group set includes at least one SRS resource group, and each of the SRS resource group includes at least one SRS resource; each of the SRS resource group set corresponds to an antenna switching capability represented by same or different xTyR.

In an implementation, in a case that multiple SRS resources in one SRS resource group are transmitted on a same time slot, the first terminal device does not transmit other signals on Y symbols between adjacent SRS resources, where Y is a positive integer.

In an implementation, the communication device determines a value of Y according to a subcarrier spacing.

In an implementation, for part of subcarrier spacings, the communication device determines the value of Y according to the first UE capability.

In an implementation, the method for indicating an antenna switching capability further includes that:

the communication device receives a second UE capability, where the second UE capability is used to indicate available symbol information that is available to the first terminal device for an SRS resource configuration in a time slot;

the communication device determines a symbol occupied by the SRS resource in a time slot according to the second UE capability.

In an implementation, the method for indicating an antenna switching capability further includes that:

the communication device receives an SRS signal sent by the first terminal device according to the configuration message;

determines a precoding matrix or a beamforming matrix of the first terminal device according to the SRS signal.

An embodiment of the present application also proposes a terminal device. FIG. 22 is a schematic structural diagram of a terminal device 2200 according to an embodiment of the present application, including:

a sending module 2210, configured to send a first UE capability, where the first UE capability indicates at least one antenna switching capability supported by the terminal device; at least part of the at least one antenna switching capability supports that the terminal device has more than 4 receiving antennas.

In an implementation, the antenna switching capability is represented by xTyR, where xTyR represents that an SRS supports transmission through x antenna ports, y corresponds to the number of all or part of receiving antennas of the first terminal device, y of at least part of xTyR is greater than 4, x and y are positive integers.

It should be understood that the above and other operations and/or functions of the module in the terminal device according to the embodiment of the present application are respectively to implement corresponding processes of the first terminal device in the method 200 of FIG. 2, and are not repeated here for brevity.

An embodiment of the present application also proposes a communication device. FIG. 23 is a schematic structural diagram of a communication device 2300 according to an embodiment of the present application, including:

a receiving module 2310, configured to receive a first UE capability, where the first UE capability indicates at least one antenna switching capability supported by a first terminal device; at least part of the at least one antenna switching capability supports that the first terminal device has more than 4 receiving antennas.

In an implementation, the antenna switching capability is represented by xTyR, where xTyR represents that an SRS supports transmission through x antenna ports, y corresponds to the number of all or part of receiving antennas of the first terminal device, y of at least part of xTyR is greater than 4, x and y are positive integers.

In an implementation, the communication device may be a network device or a terminal device.

It should be understood that the above and other operations and/or functions of the module in the communication device according to the embodiment of the present application are respectively to implement corresponding processes of the communication device in the method 2100 of FIG. 21, and are not repeated here for brevity.

Figure 24:
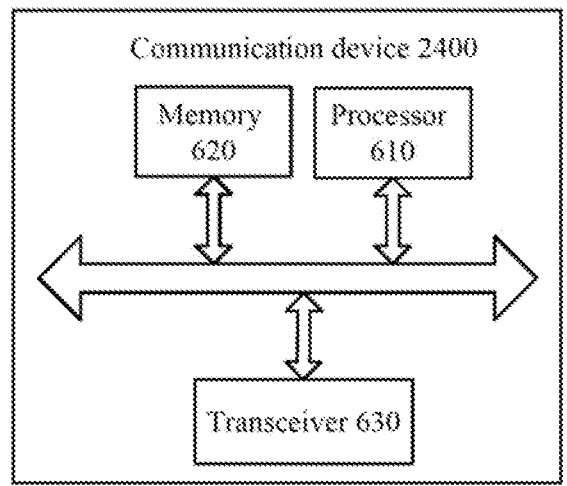
FIG. 24 is a schematic structural diagram of a communication device 2400 according to an embodiment of the present application.

FIG. 24 is a schematic structural diagram of a communication device 2400 according to an embodiment of the present application. The communication device 2400 shown in FIG. 24 includes a processor 610, and the processor 610 can call and run a computer program from a memory to implement the method in the embodiments of the present application.

In an implementation, as shown in FIG. 24, the communication device 2400 may also include a memory 620, where the processor 610 can call and run a computer program from the memory 620 to implement the method in the embodiments of the present application.

The memory 620 may be a separate device independent of the processor 610, or may be integrated in the processor 610.

In an implementation, as shown in FIG. 24, the communication device 2400 may further include a transceiver 630, and the processor 610 can control the transceiver 630 to communicate with other devices, specifically, to send information or data to other devices, or receive information or data sent by other devices.

The transceiver 630 may include a transmitter and a receiver. The transceiver 630 may further include antennas, and the number of antennas may be one or more.

In an implementation, the communication device 2400 may be the terminal device of the embodiments of the present application, and this terminal device 2400 can implement corresponding processes implemented by the terminal device in each method of the embodiments of the present application, which is not repeated here for brevity.

In an implementation, the communication device 2400 may be the communication device of the embodiments of the present application, such as the network device or the second terminal device, and this communication device 2400 can implement corresponding processes implemented by the communication device in each method of the embodiments of the present application, which is not repeated here for brevity.

Figure 25:
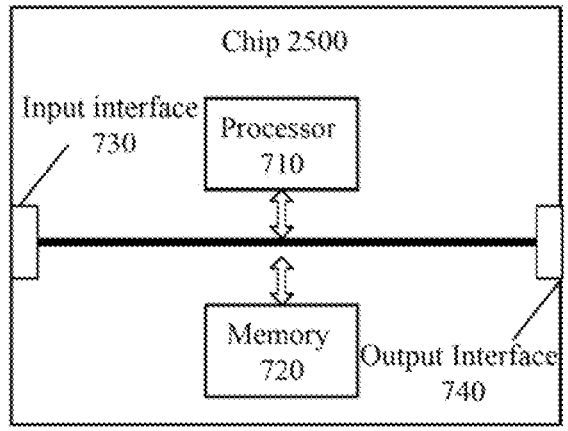
FIG. 25 is a schematic structural diagram of a chip 2500 according to an embodiment of the present application.

FIG. 25 is a schematic structural diagram of a chip 2500 according to an embodiment of the present application. The chip 2500 shown in FIG. 25 includes a processor 710, where the processor 710 can call and run a computer program from a memory to implement the method in the embodiments of the present application.

In an implementation, as shown in FIG. 25, the chip 2500 may further include a memory 720, where the processor 710 can call and run a computer program from the memory 720 to implement the method in the embodiments of the present application.

The memory 720 may be a separate device independent of the processor 710, or may be integrated in the processor 710.

In an implementation, the chip 2500 may further include an input interface 730. The processor 710 can control the input interface 730 to communicate with other devices or chips, specifically, to obtain information or data seat by other devices or chips.

In an implementation, the chip 2500 may further include an output interface 740. The processor 710 can control the output interface 740 to communicate with other devices or chips, specifically, to output information or data to other devices or chips.

In an implementation, the chip may be applied to the terminal device in the embodiments of the present application, and the chip can implement corresponding processes implemented by the terminal device in each method of the embodiments of the present application, which is not repeated here for brevity.

In an implementation, the chip may be applied to the communication device in the embodiments of the present application, such as the network device or the second terminal device, and the chip can implement corresponding processes implemented d by the communication device in each method of the embodiments of the present application, which is not repeated here for brevity.

It should be understood that the chip mentioned in the embodiments of the present application may also be referred to as a system level chip, a system chip, a chip system or a system on chip.

The processor mentioned above may be a general-purpose processor, a digital signal processor (DSP), a field programmable gate array (FPGA), an application specific integrated circuit (ASIC) or other programmable logic devices, transistor logic devices, discrete hardware components, etc. The general-purpose processor mentioned above may be a microprocessor, or may be any conventional processor, etc.

The memory mentioned above may be a volatile memory or a nonvolatile memory, or may include both volatile and nonvolatile memories. The nonvolatile memory may be a read-only memory (ROM), a programmable read-only memory (PROM), an erasable programmable read-only memory (EPROM), an electrically erasable programmable read-only memory (EEPROM) or a flash memory. The volatile memory may be a random access memory (RAM).

It should be understood that the above memory is exemplary but not restrictive. For example, the memory in the embodiments of the present application may also be a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synch link dynamic random access memory (SLDRAM), a direct rambus random access memory (DR RAM), etc. That is, the memory in the embodiments of the present application is intended to include but not limited to these and any other suitable types of memories.

The above embodiments may be implemented in whole or in part by software, hardware, firmware or any combination thereof. When implemented in software, they may be implemented in whole or in part in a form of a computer program product. The computer program product includes one or more computer instructions. When the computer program instructions are loaded and executed on a computer, all or part of the processes or functions described in the embodiments of the present application are generated. The computer may be a general-purpose computer, a special-purpose computer, a computer network, or other programmable apparatuses. The computer instructions may be stored in a computer-readable storage medium or transmitted from one computer-readable storage medium to another computer-readable storage medium. For example, the computer instructions may be transmitted from a website, computer, server or data center to another website site, computer, server or data center in wired manner (such as a coaxial cable, an optical fiber, a digital subscriber line (DSL) or in wireless manner (such as infrared, wireless, microwave, etc.). The computer-readable storage medium may be any available medium that may be accessed by a computer, or a data storage device such as a server and a data center integrated with one or more available media. The available media may be a magnetic medium (e.g., a floppy disk, a hard disk, a magnetic tape), an optical medium (e.g., a DVD), or a semiconductor medium (e.g., a solid state disk (SSD)), etc.

It should be understood that in various embodiments of the present application, the size of the sequence numbers of above processes does not mean an order of execution. The execution order of each process should be determined by its function and internal logic, and should not constitute any limitation on an implementation process of the embodiments of the present application.

Those skilled in the art can clearly understand that, for the convenience and simplicity of description, a specific working process of above described systems, apparatuses and units may refer to the corresponding process in the above method embodiments, which will not be repeated here.

The above are only the specific embodiments of the present application, but the protection scope of the present application is not limited to this. Any person skilled in the art can easily think of changes or replacements within the technical scope disclosed in the present application, which should be covered within the protection scope of the present application. Therefore, the protection scope of the present application shall be subject to the protection scope of the claims.

What is claimed is:

1. A method for indicating an antenna switching capability, comprising:
   sending, by a first terminal device, a first user equipment (UE) capability, wherein the first UE capability indicates an antenna switching capability supported by the first terminal device; wherein at least part of the antenna switching capability supports that the first terminal device has more than 4 receiving antennas;
   wherein the antenna switching capability is represented by xTyR, wherein the xTyR represents that a sounding reference signal (SRS) supports transmission through x antenna ports, y corresponds to the number of all or part of receiving antennas of the first terminal device, y of at least part of the xTyR is greater than 4, x and y are positive integers;
   wherein sending, by the first terminal device, the first UE capability comprises;
      sending, by the first terminal device, the first UE capability through a first radio resource control (RRC) signaling, wherein the first RRC signaling carries the xTyR corresponding to part of the antenna switching capabilities indicated by the first UE capability; or
      sending, by the first terminal device, the first UE capability through a second RRC signaling and a third RRC signaling, wherein the second RRC signaling indicates a first subset of the antenna switching capability, and the third RRC signaling indicates a second subset of the antenna switching capability; the first subset and the second subset comprise different antenna switching capabilities, and a union of the first subset and the second subset comprises the antenna switching capability indicated by the first UE capability,
   wherein the first UE capability indicates antenna switching capabilities represented by 1T1R, 1T2R, 1T4R, 1T6R, 1T8R, 2T2R, 2T4R, 2T6R, 2T8R, 4T4R and 4T8R, respectively;
   wherein the method further comprises:
   receiving, by the first terminal device, a configuration message corresponding to the antenna switching capability indicated by the first UE capability;
   wherein the configuration message indicates at least one SRS resource group set, each of the SRS resource group set comprises at least one SRS resource group, and each of the SRS resource group comprises at least one SRS resource: each of the SRS resource group set corresponds to the antenna switching capability represented by the same or different xTyR;
   wherein the at least one SRS resource occupies all or part of symbols in a time slot,
   wherein a symbol occupied by the at least one SRS resource is determined according to a second UE capability reported by the first terminal device.

2. The method according to claim 1, wherein that y of the at least part of the xTyR is greater than 4 comprises that:
   there is at least one xTyR with y being one of 6 and 8; or, there is at least one xTyR with y being 8.

3. The method according to claim 1, wherein sending, by the first terminal device, the first UE capability comprises:
   sending, by the first terminal device, the first UE capability to a communication device, wherein the communication device is a network device or a second terminal device.

4. The method according to claim 1, wherein in a case that multiple SRS resources in one SRS resource group are transmitted on a same time slot, the first terminal device does not transmit other signals on Y symbols between adjacent SRS resources, wherein Y is a positive integer.

5. The method according to claim 4, wherein a value of Y is determined according to a subcarrier spacing.

6. The method according to claim 1, wherein in a case that the first terminal device does not report the second UE capability, the at least one SRS resource occupies at least one symbol of last 6 symbols in a time slot.

7. The method according to claim 1, wherein the second UE capability is used to indicate available symbol information that is available to the first terminal device for an SRS resource configuration in a time slot.

8. The method according to claim 1, wherein a usage field in a radio resource control (RRC) information element (IE) corresponding to the SRS resource group is configured as antenna switching.

9. The method according to claim 1, wherein resource type fields corresponding to at least two SRS resource groups in a same SRS resource group set are configured with a same value.

10. The method according to claim 1, wherein a configurable value of a resource type field corresponding to the SRS resource group is: aperiodic, semi-persistent and periodic.

11. The method according to claim 1, wherein if a resource type field corresponding to the SRS resource group in the SRS resource group set is configured as periodic or semi-persistent, then the SRS resource group set comprises one SRS resource group.

12. The method according to claim 1, wherein a subcarrier spacing corresponding to the at least one SRS resource is:
   one of 15 kHz, 30 kHz, 60 kHz and 120 kHz; or
   one of 15 kHz, 30 kHz, 60 kHz, 120 kHz, 240 kHz, 480 kHz, 960 kHz and 1920 kHz; or,
   one of 15 kHz, 30 kHz, 60 kHz, 120 kHz, 240 kHz, 480 kHz and 960 kHz; or,
   one of 15 kHz, 30 kHz, 60 kHz, 120 kHz, 240 kHz and 480 kHz; or,
   one of 15 kHz, 30 kHz, 60 kHz, 120 kHz and 240 KHz.

13. The method according to claim 1, wherein part or all of following power parameters corresponding to multiple SRS resource groups in a same SRS resource group set are the same:
   alpha;
   p0;
   path loss reference signal;
   SRS power control adjustment states.

14. The method according to claim 1, wherein SRS ports of the at least one SRS resource comprised in a same SRS resource group set correspond to different antenna ports of the first terminal device.

15. The method according to claim 1, further comprising:
   sending, by the first terminal device, an SRS signal according to the configuration message.

16. A terminal device, comprising: a processor and a memory, wherein the memory is configured to store a computer program, and the processor is configured to:

send a first user equipment (UE) capability, wherein the first UE capability indicates an antenna switching capability supported by the terminal device; at least part of the antenna switching capability supports that the terminal device has more than 4 receiving antennas;

wherein the antenna switching capability is represented by xTyR, wherein the xTyR represents that a sounding reference signal (SRS) supports transmission through x antenna ports, y corresponds to the number of all or part of receiving antennas of the terminal device, y of at least part of the xTyR is greater than 4, x and y are positive integers;

wherein the processor is specifically configured to:
  send the first UE capability through a first radio resource control (RRC) signaling, wherein the first RRC signaling carries the xTyR corresponding to part of the antenna switching capabilities indicated by the first UE capability; or
  send the first UE capability through a second RRC signaling and a third RRC signaling, wherein the second RRC signaling indicates a first subset of the antenna switching capability, and the third RRC signaling indicates a second subset of the antenna switching capability; the first subset and the second subset comprise different antenna switching capabilities, and a union of the first subset and the second subset comprises the antenna switching capability indicated by the first UE capability;

wherein the first UE capability indicates antenna switching capabilities represented by 1T1R, 1T2R, 1T4R, 1T6R, 1T8R, 2T2R, 2T4R, 2T6R, 2T8R, 4T4R and 4T8R, respectively;

wherein the processor is further configured to:
receive a configuration message corresponding to the antenna switching capability indicated by the first UE capability;

wherein the configuration message indicates at least one SRS resource group set each of the SRS resource group set comprises at least one SRS resource group and each of the SRS resource group comprises at least one SRS resource; each of the SRS resource group set corresponds to the antenna switching capability represented by the same or different xTyR;

wherein the at least one SRS resource occupies all or part of symbols in a time slot, wherein a symbol occupied by the at least one SRS resource is determined according to a second UE capability reported by the terminal device.

17. A communication device, comprising: a processor and a memory, wherein the memory is configured to store a computer program, and the processor is configured to:

receive a first user equipment (UE) capability, wherein the first UE capability indicates an antenna switching capability supported by a first terminal device; at least part of the antenna switching capability supports that the first terminal device has more than 4 receiving antennas;

wherein the antenna switching capability is represented by xTyR, wherein the xTyR represents that a sounding reference signal (SRS) supports transmission through x antenna ports, y corresponds to the number of all or part of receiving antennas of the first terminal device, y of at least part of the xTyR is greater than 4, x and y are positive integers;

wherein the processor is specifically configured to:
  receive the first UE capability through a first radio resource control (RRC) signaling, wherein the first RRC signaling carries the xTyR corresponding to part of the antenna switching capabilities indicated by the first UE capability; or
  receive the first UE capability through a second RRC signaling and a third RRC signaling, wherein the second RRC signaling indicates a first subset of the antenna switching capability, and the third RRC signaling indicates a second subset of the antenna switching capability; the first subset and the second subset comprise different antenna switching capabilities, and a union of the first subset and the second subset comprises the antenna switching capability indicated by the first UE capability;

wherein the first UE capability indicates antenna switching capabilities represented by 1T1R, 1T2R, 1T4R, 1T6R, 1T8R, 2T2R, 2T4R, 2T6R, 2T8R, 4T4R and 4T8R, respectively;

wherein the processor is further configured to:
send a configuration message corresponding to the antenna switching capability indicated by the first UE capability:

wherein the configuration message indicates at least one SRS resource group set, each of the SRS resource group set comprises at least one SRS resource group and each of the SRS resource group comprises at least one SRS resource; each of the SRS resource group set corresponds to the antenna switching capability represented by the same or different xTyR;

wherein the at least one SRS resource occupies all or part of symbols in a time slot, wherein a symbol occupied by the at least one SRS resource is determined according to a second UE capability reported by the first terminal device.

* * * * *